United States Patent [19]

Asaki et al.

[11] Patent Number: 5,056,473
[45] Date of Patent: Oct. 15, 1991

[54] INTAKE DEVICE FOR MULTI-CYLINDER INTERNAL COMBUSTION ENGINE

[75] Inventors: Yasuaki Asaki; Masaaki Hiratani; Yasuo Kitami, all of Saitama, Japan

[73] Assignee: Honda Giken Kogyo Kabushiki Kaisha, Tokyo, Japan

[21] Appl. No.: 530,008

[22] Filed: May 29, 1990

[30] Foreign Application Priority Data

May 29, 1989 [JP]   Japan ................................. 1-135199

[51] Int. Cl.⁵ ............................................ F02M 35/10
[52] U.S. Cl. ......................... 123/52 MB; 123/52 MV
[58] Field of Search ......... 123/52 M, 52 MV, 52 MB, 123/52 MC

[56] References Cited

U.S. PATENT DOCUMENTS

| | | | |
|---|---|---|---|
| 4,622,926 | 11/1986 | Rutschmann et al. | 123/52 MB |
| 4,643,136 | 2/1987 | Ura et al. | 123/52 M |
| 4,643,138 | 2/1987 | Ruf et al. | 123/52 MV |
| 4,649,871 | 3/1987 | Hatamura et al. | 123/52 MC |
| 4,736,714 | 4/1988 | Hokazono et al. | 123/52 M |
| 4,741,294 | 5/1988 | Yasuda et al. | 123/52 MV |
| 4,741,295 | 5/1988 | Hosoya et al. | 123/52 MV |
| 4,756,284 | 7/1988 | Okimoto et al. | 123/52 MB |
| 4,784,091 | 11/1988 | Okada et al. | 123/52 MV |
| 4,803,961 | 2/1989 | Hiraoka et al | 123/52 MB |
| 4,809,647 | 3/1989 | Masumato et al. | 123/52 MB |
| 4,827,879 | 5/1989 | Ohmi et al. | 123/52 MV |
| 4,829,941 | 5/1989 | Hitomi et al. | 123/52 MV |
| 4,838,215 | 6/1989 | Yasuda et al. | 123/52 MV |
| 4,854,271 | 8/1989 | Miyano et al. | 123/52 MB |
| 4,875,438 | 10/1989 | Suzuki | 123/52 MB |
| 4,957,071 | 9/1990 | Matsuo et al. | 123/52 MV |

FOREIGN PATENT DOCUMENTS

| | | |
|---|---|---|
| 0265960 | 5/1988 | European Pat. Off. . |
| 60-169627 | 3/1985 | Japan . |
| 2168752A | 6/1986 | United Kingdom . |
| 2180594 | 4/1987 | United Kingdom . |

Primary Examiner—David A. Okonsky
Attorney, Agent, or Firm—Lyon & Lyon

[57] ABSTRACT

In an intake device for a multi-cylinder internal combustion engine, comprising a pair of resonance chambers and a pair of resonance passages, the resonance chambers and the resonance passages are disposed in parallel in a V-space in the internal combustion engine with a dividing wall interposed therebetween, thereby providing a compact intake system. In the intake device, the resonance chambers are defined in one of upper and lower assembly box portions, while the resonance passages are defined in the other assembly box portion, and an on-off valve capable of changing suction characteristics of the internal combustion engine is provided in a plate-like valve unit separating and joined to the opened surfaces of the two box portions. This enables a reasonable layout of the on-off valve. Further, in the intake device, the resonance chambers are capable of communicating with each other through a communication chamber having a predetermined volume. This ensures both a resonance supercharge effect and an inertia supercharge effect.

8 Claims, 27 Drawing Sheets

INTAKE DEVICE FOR MULTI-CYLINDER INTERNAL COMBUSTION ENGINE

BACKGROUND OF THE INVENTION

1. Field of the Invention

The field of the present invention is improvements of intake devices designed to provide an increase in volume efficiency of a multi-cylinder combustion engine by controlling the variation in intake gas pressure in an intake system.

2. Description of the Prior Art

There is an already known intake device for multi-cylinder internal combustion engines, which is designed to increase the volume efficiency in a region of from a lower speed to a higher speed by controlling the length and volume of the intake system in a variable manner in accordance with the operational condition of the engine to accomplish one of two effects: a resonance effect that variations in intake gas pressure resonate between cylinders which produce no suction interference and an inertia effect utilizing the fact that a negative pressure wave produced at the beginning of suction for every cylinder is reflected at an increased volume portion provided in the intake system back to an intake port (for example, see Japanese Patent Application Laid-open No. 169627/85).

The above intake device comprises a pair of resonance chambers defined in the increased volume portion provided in the intake system and communicating with groups of cylinders having such an order of ignition that any one of the cylinders is not ignited immediately before or after ignition of the other cylinders of the same group, and an on-off valve provided between the chambers for permitting the chambers to be put into and out of communication with each other, whereby controlling of the opening and closing of the on-off valve causes the intake system to be switched to a resonance supercharge system or an inertia supercharge system. Further, controlling of the opening and closing of another on-off valve provided between a pair of resonance passages connected to upstream sides of the pair of resonance chambers causes the speed region of the engine permitting accomplishment of a resonance supercharge effect in a lower speed region to be switched at two stages, thereby increasing the volume efficiency over a totally wider speed region of the engine.

When such intake device is disposed in a V-shaped space in a V-shaped multi-cylinder internal combustion engine, it is difficult to suitably dispose the resonance passages and the resonance chambers without hindering the suction efficiency, because the space is extremely narrow. An on-off valve capable of changing the suction characteristics is also provided in a resonance chamber assembly box provided with the resonance passages and the resonance chambers. However, the disposition of the on-off valve within the resonance chamber assembly box causes problems of not only an increase in size of the intake system to create a difficulty in the layout thereof, but also a complication of the structure, resulting in an increased cost of manufacture. Further, in an intake device which is designed to establish a resonance supercharge system or an inertia supercharge system by permitting the resonance passages and the resonance chambers to be put into or out of communication each other through the on-off valve, it is extremely difficult to set the volumes of the resonance passages and the resonance chambers so that both the resonance supercharge effect and the inertia supercharge effect may be optimally accomplished.

SUMMARY OF THE INVENTION

Therefore, it is a first object of the present invention to provide a reasonable layout of an intake system comprising resonance passages and resonance chambers in a narrower V-space in a V-shaped multi-cylinder internal combustion engine.

It is a second object of the present invention to provide a reasonable layout of on-off valves capable of changing suction characteristics in a resonance chamber assembly box comprising resonance passages and resonance chambers.

Further, it is a third object of the present invention to optimally accomplish both a resonance supercharge effect and an inertia supercharge effect in an intake device designed to establish a resonance supercharge system and an inertia supercharge system by permitting the resonance passages and the resonance chambers to be put into or out of communication with each other through on-off valves.

To achieve the above first object, according to the present invention, it is proposed an intake device for a multi-cylinder internal combustion engine, the engine being V-shaped and including left and right groups of cylinders having such an order of ignition that any one of the cylinders is not ignited immediately before or after ignition of the other cylinders of the same group, and the intake device comprising a pair of resonance chambers independently communicating with the left and right groups cylinders, and a pair of resonance passages communicating at their downstream sides with the resonance chambers and at their upstream sides with the atmosphere through a throttle valve, wherein the pair of resonance chambers and the pair of resonance passages are disposed in parallel in a V-space defined between the left and right groups of cylinders with a common dividing wall interposed therebetween.

With the above construction, the resonance chambers and the resonance passages for establishing a resonance supercharge system are disposed in parallel in the V-space defined between the left and right groups of cylinder in the V-shaped multi-cylinder internal combustion engine with the common dividing wall interposed therebetween and therefore, both of the resonance chambers and the resonance passages are reasonably contained within the V-space. This provides a compact sized intake system to enable an effective utilization of a space within an engine room.

To achieve the above second object, according to the present invention, there is proposed an intake device for a multi-cylinder internal combustion engine, comprising a pair of resonance chambers independently communicating with groups of cylinders having such an order of ignition that any one of the cylinders is not ignited immediately before or after ignition of the other cylinders of the same group, and a pair of resonance passages communicating at their downstream sides with the resonance chambers and at their upstream sides with the atmosphere through a throttle valve, wherein the intake device further includes a resonance chamber assembly box which comprises an upper assembly box portion opened at a lower surface thereof, a lower assembly box portion opened at an upper surface thereof, and a plate-like valve unit dividing the opened surfaces of the upper and lower assembly box portions, the pair of resonance chambers being formed in one of the assembly box portions, the pair of resonance passages being formed in the other assembly box portion, and an on-off valve capable of changing suction characteristics of the engine being provided in the valve unit.

With the above construction, that is among the upper assembly box portion, the lower assembly box portion and the plate-like valve unit dividing the opened surface of the two assembly box portions, which constitute the resonance chamber assembly box, the left and right resonance chambers are defined in one of the assembly box portions, the resonance passages are formed in the other assembly box portion, and the on-off valve is provided in the valve unit. This provides a reasonable layout of the pair of resonance chambers, the pair of resonance passages and the on-off valve within the resonance chamber assembly box, leading to not only a compact intake system, but also to a simplified structure thereof to enable a reduction in manufacturing cost.

Again to achieve the second object, according to a third aspect of the present invention, there is proposed an intake device for a multi-cylinder internal combustion engine, comprising a pair of resonance chambers independently communicating with groups of cylinders having such an order of ignition that any one of the cylinders is not ignited immediately before or after ignition of the other cylinders of the same group, and a pair of resonance passages communicating at their downstream sides with the resonance chambers and at their upstream sides with the atmosphere through a throttle valve, wherein the intake device further includes a resonance chamber assembly box which comprises an upper assembly box portion opened at a lower surface thereof, a lower assembly box portion opened at an upper surface thereof, and a plate-like valve unit dividing the opened surfaces of the upper and lower assembly box portions, the pair of resonance chambers being formed in one of the assembly box portions, the pair of resonance passages being formed in the other assembly box portion, and the valve unit including an on-off valve for changing the length of the resonance passages and another on-off valve for permitting the resonance chambers to be put into communication with each other, these valves being disposed in a plane where the valve unit lies.

With the above construction, the on-off valve for changing the length of the resonance passages and the another on-off valve for permitting the pair of resonance chambers to be put into communication with each other are disposed in the same plane of the valve unit and therefore, it is possible to provide a further reduction in the size of the intake system and a simplified structure.

Further, to achieve the third object, according to a fourth aspect of the present invention, there is proposed an intake device for a multi-cylinder internal combustion engine, comprising a pair of resonance chambers independently communicating with groups of cylinders having such an order of ignition that any one of the cylinders is not ignited immediately before or after ignition of the other cylinders of the same group, and a pair of resonance passages communicating at their downstream sides with the resonance chambers and at their upstream sides with the atmosphere through a throttle valve, wherein the intake device further includes a communication chamber provided between the pair of resonance chambers, so that the resonance chambers communicate with each other through the communication chamber.

With the above construction, even if the volume of each of the resonance chambers is set at a value enough to provide an optimal resonance supercharge effect in a lower speed operational region, the volume of a chamber resulting from the communication of the resonance chambers with each other to establish an inertia supercharge system in a higher speed operation region can be set at a sufficiently large and optimal value by proper setting of the volume of the communication chamber.

The above and other objects, features and advantages of the invention will become apparent from the following description of the preferred embodiments, taken in conjunction with the accompanying drawings.

BRIEF DESCRIPTION OF THE DRAWINGS

FIGS. 1 to 5 illustrate a first embodiment of the present invention, wherein

FIG. 1 is a front view in longitudinal section of details of a V-type six cylinder internal combustion engine equiped with an intake device according to the present invention;

FIG. 2 is a plan view of a cylinder block in the engine;

FIG. 3 is an enlarged partial plan view taken along a line III—III in FIG. 1;

FIG. 4 is a sectional view taken along a line IV—IV in FIG. 3; and

FIG. 5 is a sectional view taken along a line V—V in FIG. 3;

FIGS. 10 to 13 illustrate a third embodiment of the present invention, wherein

FIG. 10 is a longitudinal sectional view of details of a V-type six cylinder internal combustion engine equiped with an intake device according to the present invention;

FIG. 11 is an enlarged partial plan view taken along a line XI—XI in FIG. 10;

FIG. 12 is a sectional view taken along a line XII—XII in FIG. 11; and

FIG. 13 is a sectional view taken along a line XIII—XIII in FIG. 12;

FIGS. 17 to 21 illustrate a sixth embodiment of the present invention, wherein

FIG. 17 is a longitudinal sectional view of details of a V-type six cylinder internal combustion engine equiped with an intake device according to the present invention;

FIG. 18 is an enlarged partial plan view taken along a line XVIII—XVIII in FIG. 17;

FIG. 19 is an enlarged partial plan view taken along a line XIX—XIX in FIG. 17;

FIG. 20 is a sectional view taken along a line XX—XX in FIG. 18; and

FIG. 21 is a sectional view taken along a line XXI—XXI in FIG. 18;

FIGS. 23 to 26 illustrate an eighth embodiment of the present invention, wherein FIG. 23 is a longitudinal sectioal view of details of a V-type six cylinder internal combustion engine equiped with an intake device according to the present invention;

FIG. 24 is an enlarged partial plan view taken along a line XXIV—XXIV in FIG. 23;

FIG. 25 is a sectional view taken along a line XXV—XXV in FIG. 24; and

FIG. 26 is a sectional view taken along a line XXVI—XXVI in FIG. 24; and

DESCRIPTION OF THE PREFERRED EMBODIMENTS

The present invention will now be described by way of embodiments with reference to the accompanying drawings.

Figure 1:
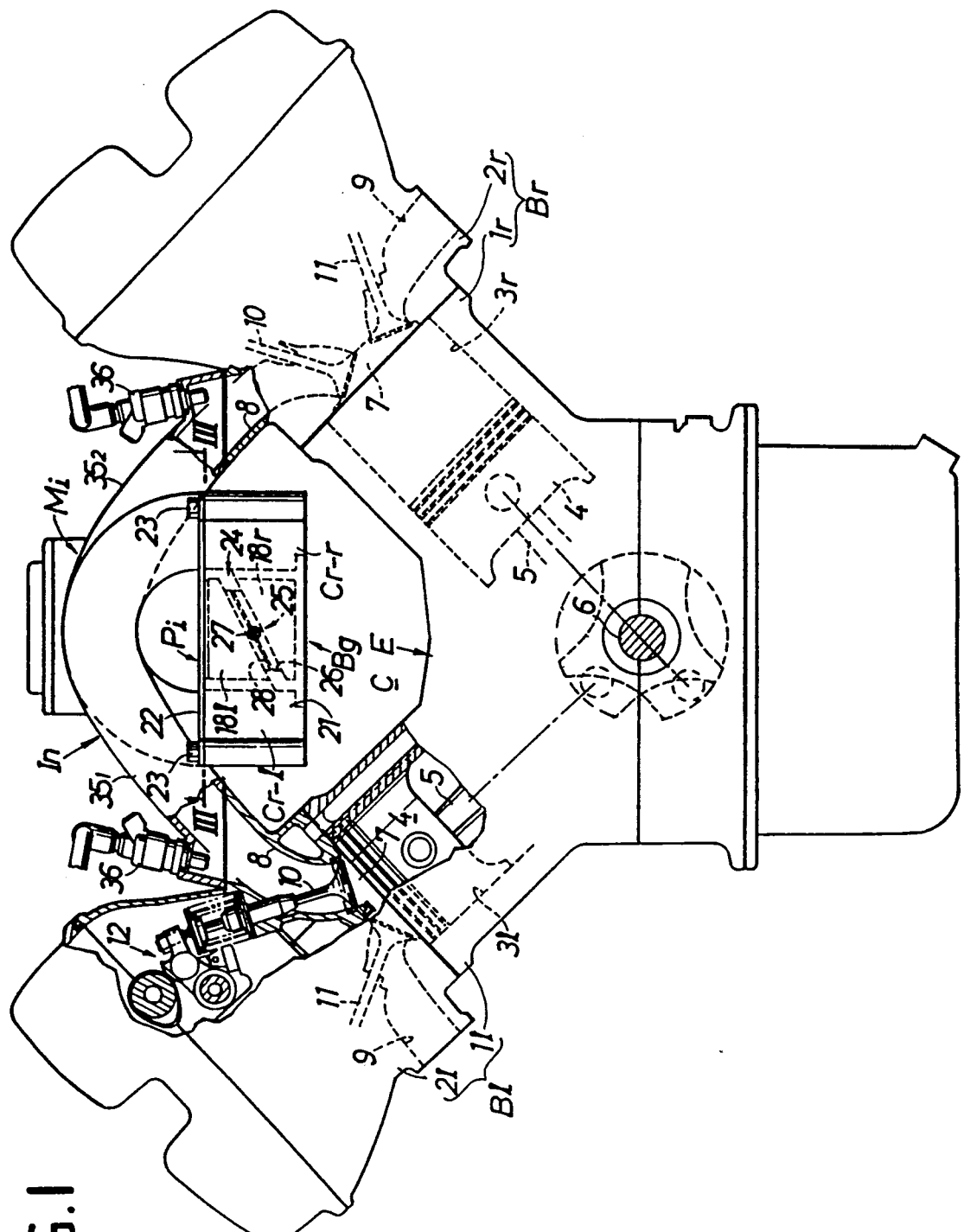
Figure 2:
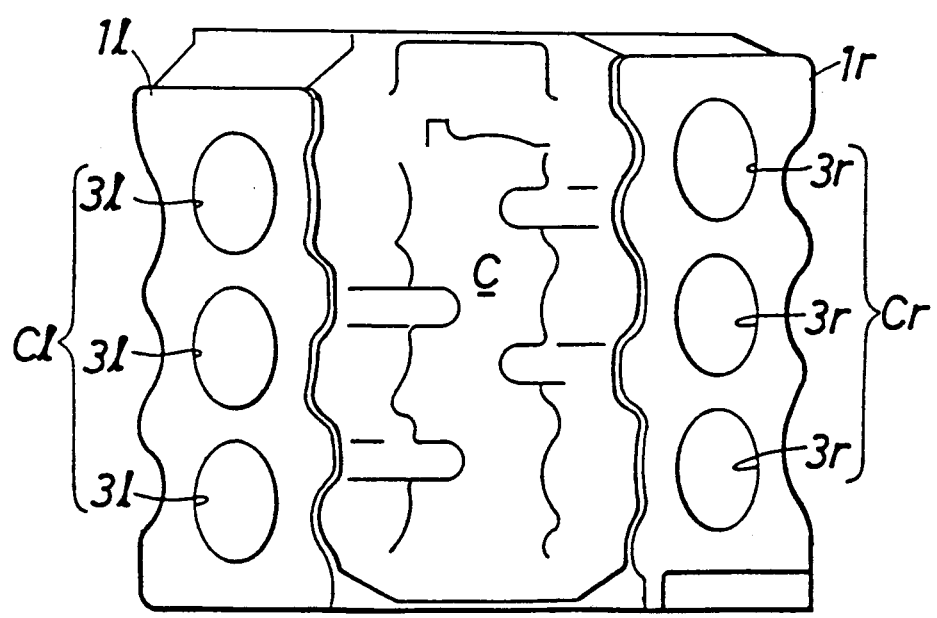

FIGS. 1 to 5 illustrate a first embodiment of the present invention. Referring to FIGS. 1 and 2, a six-cylinder type internal combustion engine E comprises a pair of left and right engine blocks Bl and Br located in a V-shaped arrangement. Each of the left and right engine blocks Bl and Br comprises a cylinder block $1l$, $1r$ and a cylinder head $2l$, $2r$ joined or bonded to a deck surface of the cylinder block, respectively. Three left cylinders $3l$ are formed in series in the left cylinder block $1l$, and three cylinders $3r$ are formed in series in the right cylinder block $1r$. The three left cylinders $3l$ constitute a left cylinder group Cl. The three right cylinders $3r$ also constitute a right cylinder group Cr. These cylinders have such an order of ignition that any one of the cylinders is not ignited immediately before or after ignition of the other cylinders of the same group, i.e., the operation of the intake valves 10 which will be described hereinafter are not overlapped.

A piston 4 is slidably received in each of the left and right cylinders $3l$ and $3r$ in a usual manner. The pistons 4 are operatively connected to a crank shaft 6 through connecting rods 5. Each of the left and right cylinder heads $2l$ and $2r$ is provided with a combustion chamber 7 and intake and exhaust ports 8 and 9 communicating with the combustion chamber 7. Each intake port 8 has an intake valve 10 provided therein for opening and closing the intake port 8, and each exhaust port 9 has an exhaust valve 11 provided therein for opening and closing the exhaust port 9. The intake and exhaust valves 10 and 11 may be opened and closed with a predetermined timing by a conventionally known valve operating mechanism 12.

An intake system In which will be described hereinafter is connected to the plurality of intake ports 8 in the left and right cylinder heads $2l$ and $2r$, and a conventionally known exhaust system which is not shown is connected to the plurality of exhaust ports 9 in the left and right cylinder heads $2l$ and $2r$.

The construction of the intake system In will be described below with reference to FIGS. 2 to 5. The intake system In is disposed in a V-space C between the left and right cylinder blocks $1l$ and $1r$ and comprises an air cleaner Ac, an intake passage Pi connected to an outlet of the air cleaner Ac, a resonance chamber assembly box Bg having a pair of left and right resonance chambers Cr-l and Cr-r and connected to a downstream end of the intake passage Pi, and an intake manifold Mi which will be described hereinafter and is joined to those the end faces of the left and right cylinder blocks $1l$ and $1r$ at which the intake ports 8 are opened, thereby permitting the communication between the left and right resonance chambers Cr-l and Cr-r and the right and left cylinder groups Cr and Cl, respectively.

Figure 3:
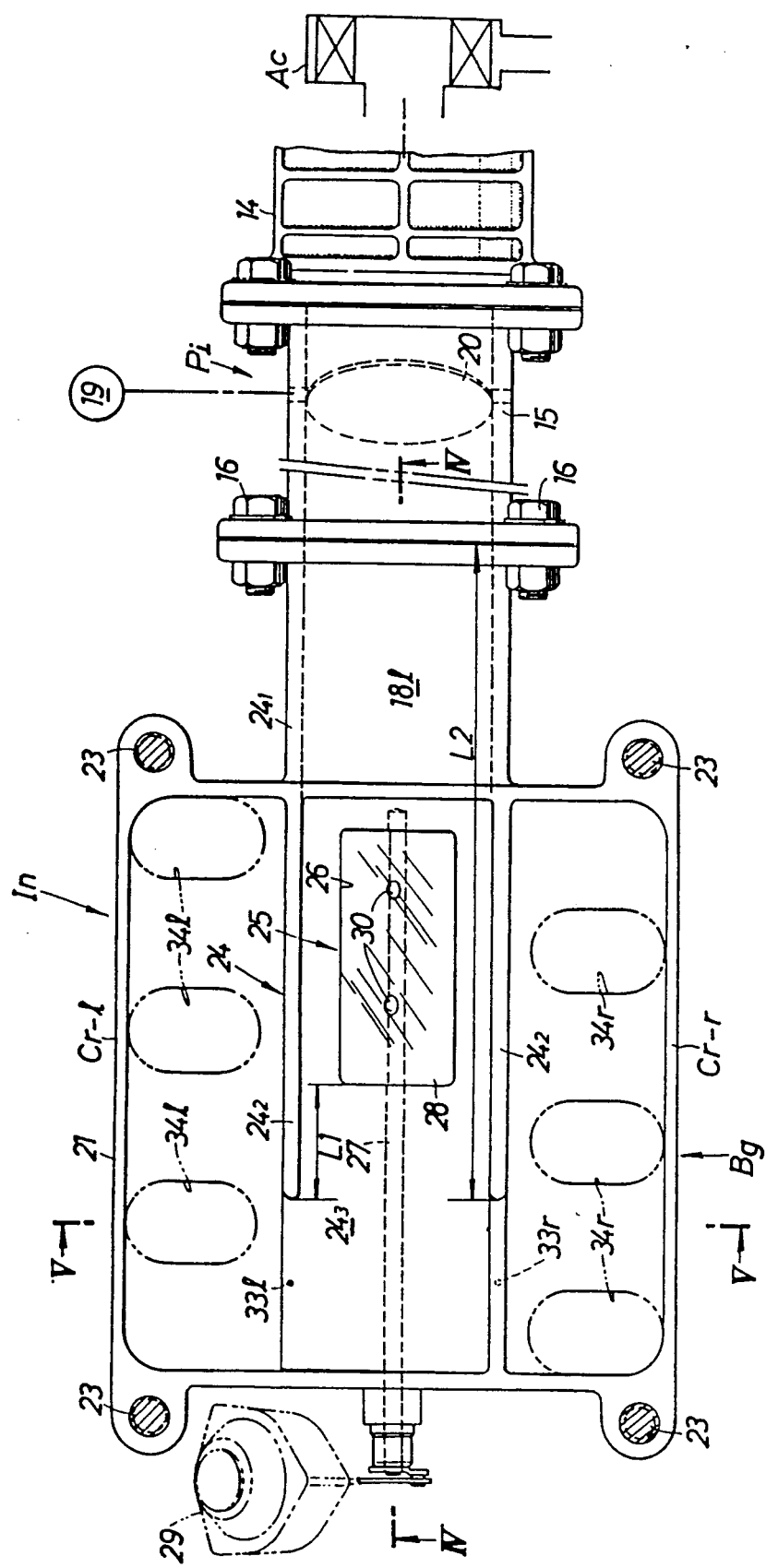

The intake passage Pi is constructed with a throttle body 15 being integrally connected to a downstream end of an intake passage 14 connected to the air cleaner Ac, as shown in FIG. 3. The intake passage 14 is formed into a hollow cylindrical shape so that an intake gas from the air cleaner Ac may be drawn thereinto, and the throttle body 15 is also formed into a hollow cylindrical shape having substantially the same diameter as the intake passage 14. A throttle valve 20 is provided within the throttle body 15 and controlled for opening and closing by a control 19.

The resonance chamber assembly box Bg is integrally connected to a downstream end of the throttle body 15 by bolts 16. The resonance chamber assembly box Bg is comprised of a substantially rectangular parallelepiped-shaped assembly box body 21 opened at its upper surface and connected to the throttle body 15, and a lid 22 air-tightly mounted on the opened surface $21_1$ by bolts 23. The lid 22 is formed integrally with the intake manifold Mi.

Figure 4:
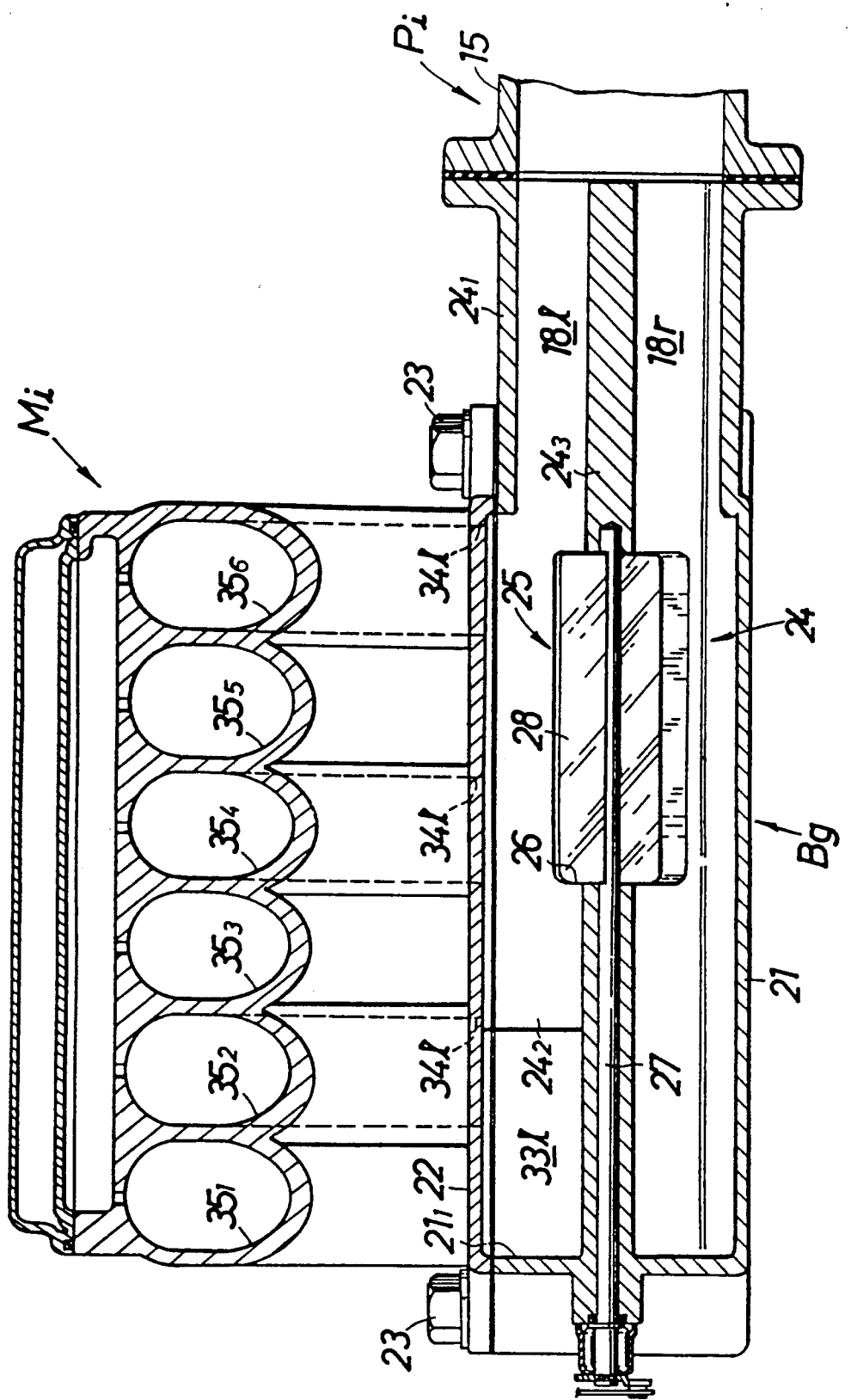
Figure 5:
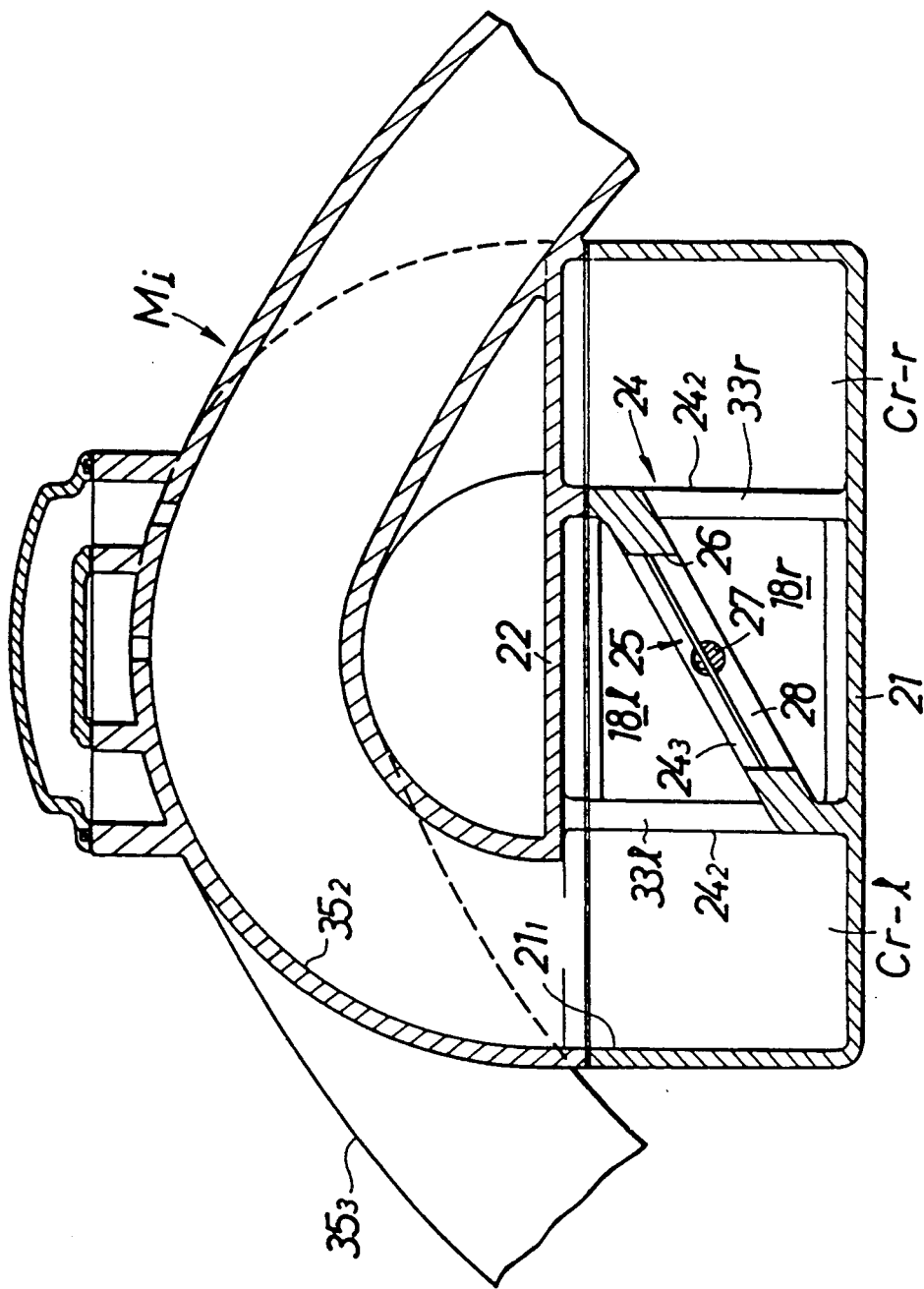

As clearly shown in FIGS. 3 and 4, the interior of the resonance chamber-assembled box Bg is divided into left and right resonance chambers Cr-l and Cr-r arranged in parallel to each other by a resonance pipe 24 extending in a direction of the crank shaft 6 of the engine, i.e., in a direction of a flow of an intake gas within the box Bg. The resonance pipe 24 is comprised of vertical walls $24_2$ which each include a short projection $24_1$ extending from a front end wall of the assembly box body 21 toward the throttle body 15 and serve as a pair of dividing walls, and an angularly inclined partition wall $24_3$ connecting a lower end of one of the vertical walls $24_2$ with an upper end of the other vertical walls $24_2$. The partition wall $24_3$ extends from a connection with the throttle body 15 to a rear end of the the assembly box body 21, and the vertical walls $24_2$ terminates at a point short of a rear end wall of the assembly box body 21. This defines a pair of resonance passages $18l$ and $18r$ of triangular cross-section at a central portion of the assembly box body 21. The resonance passages $18l$ and $18r$ permit the communication between the left and right resonance chambers Cr-l and Cr-r through left and right inlet ports $33l$ and $33r$ at its downstream end.

An on-off valve 25 is provided in the resonance pipe 24 for permitting the pair of left and right resonace passages $18l$ and $18r$ to be put into or out of communication with each other. A quadrilateral valve bore 26 is opened in a central portion of the partition wall $24_3$ of the resonance pipe 24 in a facing relation to the opened surface $21_1$, so that the left and right resonance passages $18l$ and $18r$ may be put into communication with each other through such valve bore 26. The valve bore 26 is very easy to make by a tool or the like, because it faces to the opened surface $21_1$.

A valve stem 27 is rotatably inserted in a central portion of the partition wall $24_3$ of the resonance pipe 24 to extend from the outside of the assembly box body 21 along an axis of the intake system In. The valve stem 27 extends through the central portion of the valve bore 26. A rectangular plate-like valve member 28 to be mounted in the valve bore 26 is secured to the valve stem 27 by machine screws 30. One end of the valve stem 27 passes through a rear end wall of the assembly box body 21 and projects outside this rear end, and a conventionally known actuator 29 is connected to the projecting end of the valve stem 27. The actuator 29 is controlled for operation in accordance with an operational condition of the engine, so that the on-off valve 25 is controlled for opening and closing. For example, during a lower speed operation of the engine, the on-off valve 25 is closed, and during a higher speed operation of the engine, the on-off valve is opened.

Three left and right elliptic exhaust ports $34l$, $34r$ are opened in an upper wall of each of the left and right resonance chambers Cr-l and Cr-r along its longitudinal axis. The three exhaust ports $34l$ in the left resonance chamber Cr-l commnuicate respectively with the three cylinders $3r$ (in which the intake sequence is not continuous) in the right cylinder block $1r$ located on the opposite side from the left resonance chamber Cr-l through the intake manifold Mi which will be described hereinafter, and the three exhaust ports $34r$ in the right resonance chamber Cr-r likewise communicate with the three cylinders 3 (in which the intake sequence is continuous) in the left cylinder block $1l$ located on the opposite side from the right resonance chamber Cr-r through the intake manifold Mi which will be described hereinafter.

The intake manifold Mi comprises six first to sixth distributor pipes $35_1$ to $35_6$ which are convexly curved upwardly as shown in FIGS. 1 to 5 and which are integrally arranged side-by-side in a direction substantially perpendicular to the longitudinal axes of the left and right resonance chambers Cr-l and Cr-r to extend leftwardly and rightwardly in alternately opposite directions in an intersecting manner. The three alternate pipes of these pipes, i.e., second, fourth and sixth pipes $35_2$, $35_4$ and $35_6$ communicate at their upstream ends with the three exhaust ports $34l$ in the left resonance chamber Cr-l, respectively and then extend to the opposite side from the resonance chamber Cr-l to communicate at their downstream with the three cylinders $3r$ in the right cylinder block $1r$. The remaining alternate three, i.e., first, third and fifth distributor pipes $35_1$, $35_3$ and $35_5$ communicate at their upper ends with the three exhaust ports $34r$ in the right resonance chamber Cr-r and then extend to the opposite side from the resonance chamber Cr-r to communicate at their downstream ends with the three cylinders $3l$ in the left cylinder block $1l$.

As shown in FIG. 1, a fuel ejecting nozzle 36 is mounted on upper wall of a lower end of each of the first to sixth distributor pipes $35_1$ to $35_6$.

The operation of this embodiment will be described below.

The actuator 29 is controlled for operation in accordance with the operational condition of the engine. For example, in the lower speed operational condition of the engine the on-off valve 25 is controlled to be closed as shown by a solid line in FIGS. 3 to 5 to close its valve bore 26, so that the left and right resonance passages $18l$ and $18r$ are put out of communication with each other. In this state, there are established two series of intake systems comprising the entire length of the resonance passages $18l$ and $18r$ of a length $L_2$ from a junction with the throttle body 15 to the inlet ports $33l$ and $33r$, the left and right resonance chambers Cr-l and Cr-r, and the left and right distributor pipes $35_1$, $35_3$, $35_5$ and $35_2$, $35_4$, $35_6$, i.e., two series of resonance supercharge intake systems which produce no suction interference and each extend from the three cylinders $3l$, $3r$ to the outlet of the throttle body 15. Moreover, the resonance supercharge system is relatively large in length and its natural frequency can be accorded with the period of opening and closing of each intake valve 10 in a region of lower rotation of the engine, thereby effectively accomplishing a resonance supercharge effect to enhance the volume efficiency in the lower rotation region of the engine.

On the other hand, when the engine has been brought into a higher speed operational condition, the on-off valve 25 is controlled to be opened, thereby permitting the left and right resonance passages $18l$ and $18r$ to be put into communication with each other through the valve bore 26, and the substantial length of the left and right resonance passages $18l$ and $18r$ is reduced to a length $L_1$ from the downstream end of the valve bore 26 to the inlet ports $33l$ and $33r$. In this state, the natural frequency of the two series of resonance intake systems is increased, and the period of intake pressure can be accorded with the period of opening and closing of the intake valve 10 when the engine is in high rotation, thereby effectively accomplishing a resonance supercharge effect in such operational region to enhance the volume efficiency.

Since the left and right resonance chambers Cr-l and Cr-r are defined partitioned by the resonance passages $18l$ and $18r$ within the assembly box body 21, the left and right resonance chambers Cr-l and Cr-r and the resonance passages $18l$ and $18r$ are arranged in parallel in the V-space C with the vertical walls $24_2$ interposed therebetween. Therefore, the pair of resonance passages $18l$ and $18r$ and the pair of resonance chambers Cr-l and Cr-r can be reasonably united, leading a compact size of the intake system.

Figure 6:
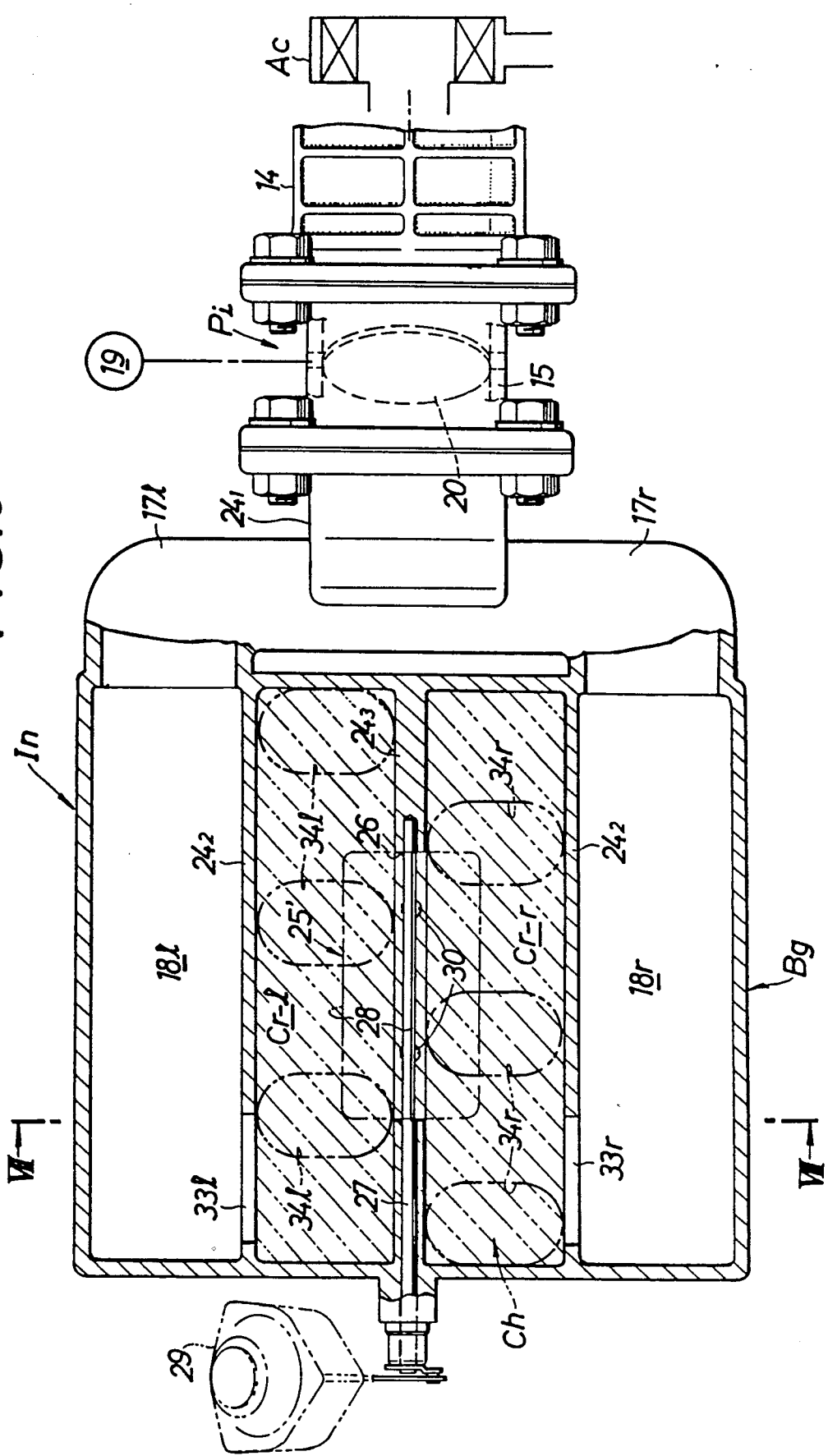
FIGS. 6 and 7 are sectional views of an intake system, similar to FIGS. 3 and 5, but showing a second embodiment of the present invention.
Figure 7:
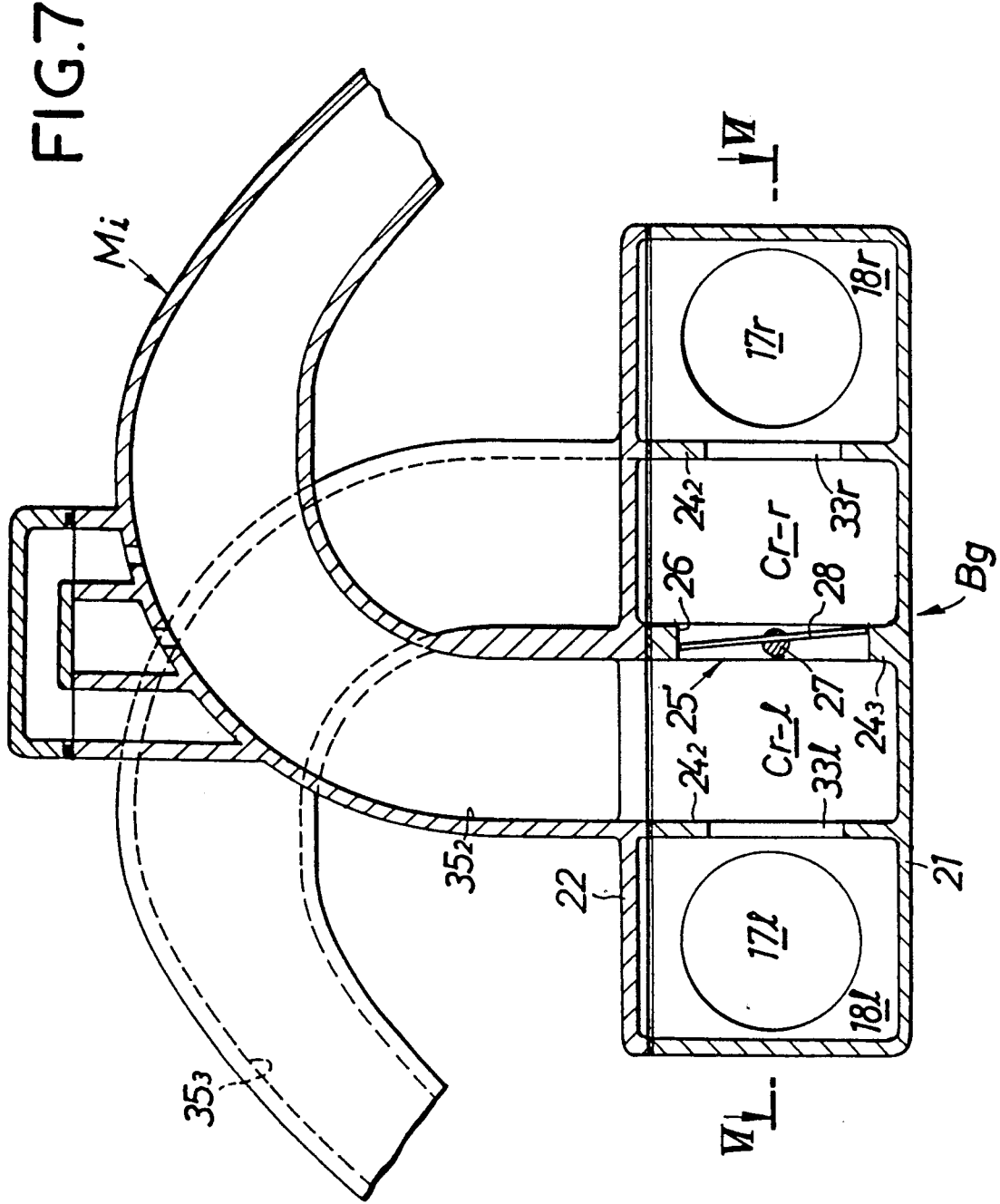

FIGS. 6 and 7 illustrate a second embodiment of the present invention, wherein components corresponding to those in the first embodiment are designated by the same reference characters.

In the second embodiment, a resonance chamber assembly box Bg is comprised of a pair of left and right resonance chambers Cr-l and Cr-r defined partitioned by a partition wall $24_3$, and a pair of resonance passages $18l$ and $18r$ defined outside the resonance chambers Cr-l and Cr-r in parallel to the resonance chambers Cr-l and Cr-r and divided by vertical walls $24_2$ as a pair of dividing walls. A downstream portion of a throttle body 15 is bifurcated to form left and right passages $17l$ and $17r$ whose downstream ends communicate with upstream ends of the resonance passages $18l$ and $18r$. Downstream ends of the resonance passages $18l$ and $18r$ communicate with the left and right resonance chambers Cr-l and Cr-r through left and right inlet ports $33l$ and $33r$ made in ends of the vertical walls $24_2$.

An on-off valve 25' is mounted in a central portion of the partition wall $24_3$ partitioning the left and right resonance chambers Cr-l and Cr-r and is controlled for opening and closing by an actuator 29. The opening of the on-off valve 25' permits the left and right resonance chambers Cr-l and Cr-r to be put into communication with each other to provide a common inertia supercharge distributor chamber Ch of a larger volume as shown by a two-dashed line in FIG. 6.

With the second embodiment, the actuator 29 is controlled for operation in accordance with the operational condition of the engine. For example, when the engine is in a lower speed operation, the on-off valve 25' is controlled to be closed, thereby putting the left and right resonance chambers Cr-l and Cr-r out of communication with each other. In this state, there are established two series of resonance supercharge intake systems which produce no suction interference and comprise the branch passages 17*l* and 17*r* of the throttle body, the left and right resonance passage 18*l* and 18*r*, the left and right resonance chambers Cr-l and Cr-r and the left and right distributor pipes $35_1$, $35_3$, $35_5$; $35_2$, $35_4$ $35_6$. Moreover, the resonance supercharge system is relatively large in length, and its natural frequency can be substantially accorded with the period of opening and closing of the each intake valve 10 in a region of lower rotation of the engine, thereby effectively accomplishing a resonance supercharge effect to increase the volume efficiency.

On the other hand, when the engine has been brought into a higher speed operational condition, the on-off valve 25' is controlled to be opened, thereby permitting the left and right resonance chambers Cr-l and Cr-r to be put into communication with each other to provide a common inertia supercharge distributor chamber Ch of a larger volume which commonly communicate with the left and right three cylinders 3*l* and 3*r*. In this state, the two series of resonance supercharge systems are cancelled and instead, an inertia supercharge system is established with a negative pressure wave produced in an intake stroke of the engine being reflected and turned over in the larger-volume inertia supercharge distributor chamber Ch and with a positive pressure wave being propagated to the intake port 8 of the each cylinder 3*l*, 3*r*. This increases the volume efficiency in the higher speed operation region of the engine.

Even in this embodiment, the arrangement of the pair of left and right resonance chambers Cr-l and Cr-r and the pair of resonance passages 18*l* and 18*r* are arranged in parallel in the V-space C with the vertical walls $24_2$ interposed therebetween makes it possible to provide a compact size of the intake system.

Figure 8:
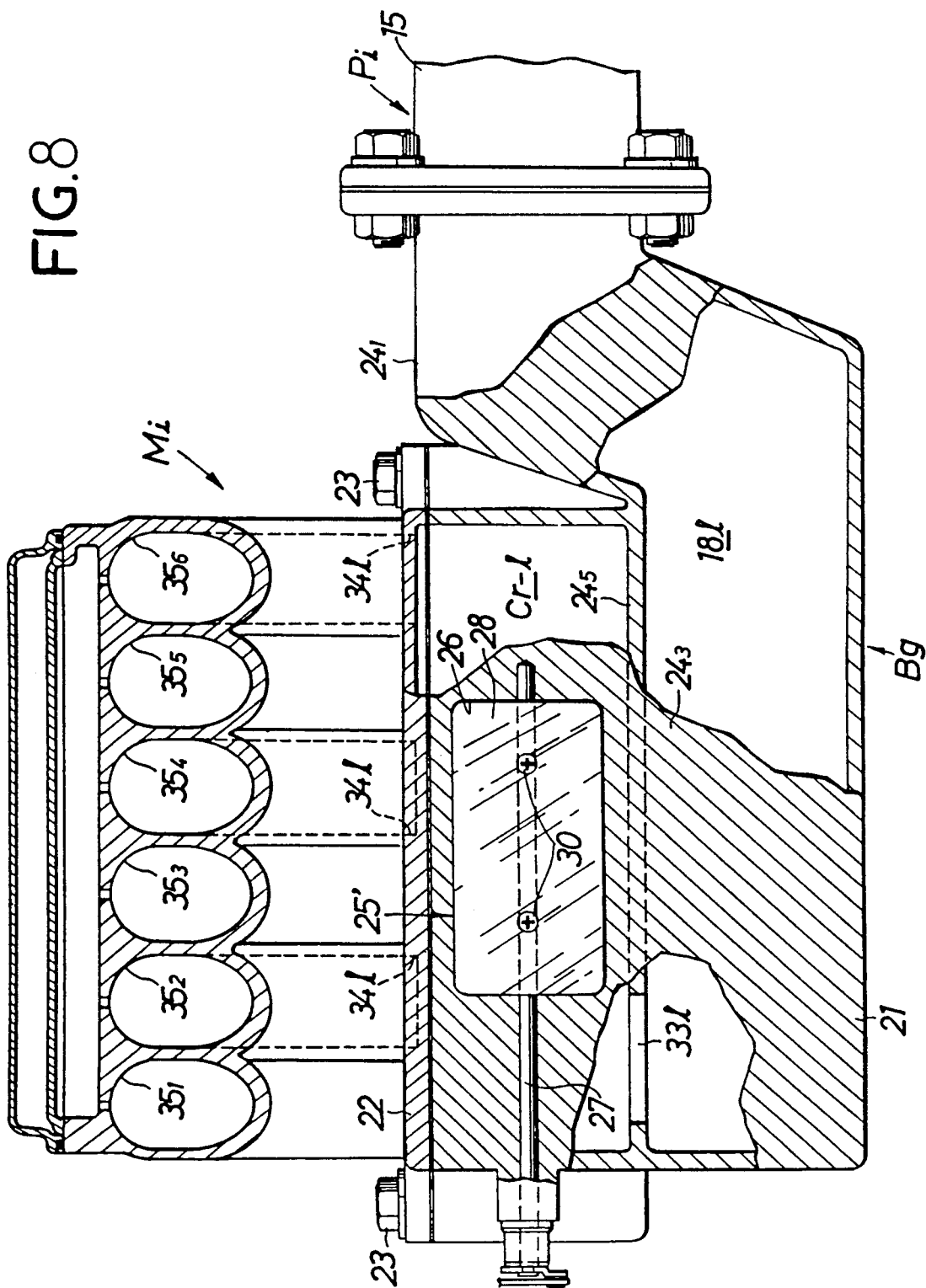
FIGS. 8 and 9 are sectional views of an intake system, similar to FIGS. 4 and 5, but showing a modification of the second embodiment.
Figure 9:
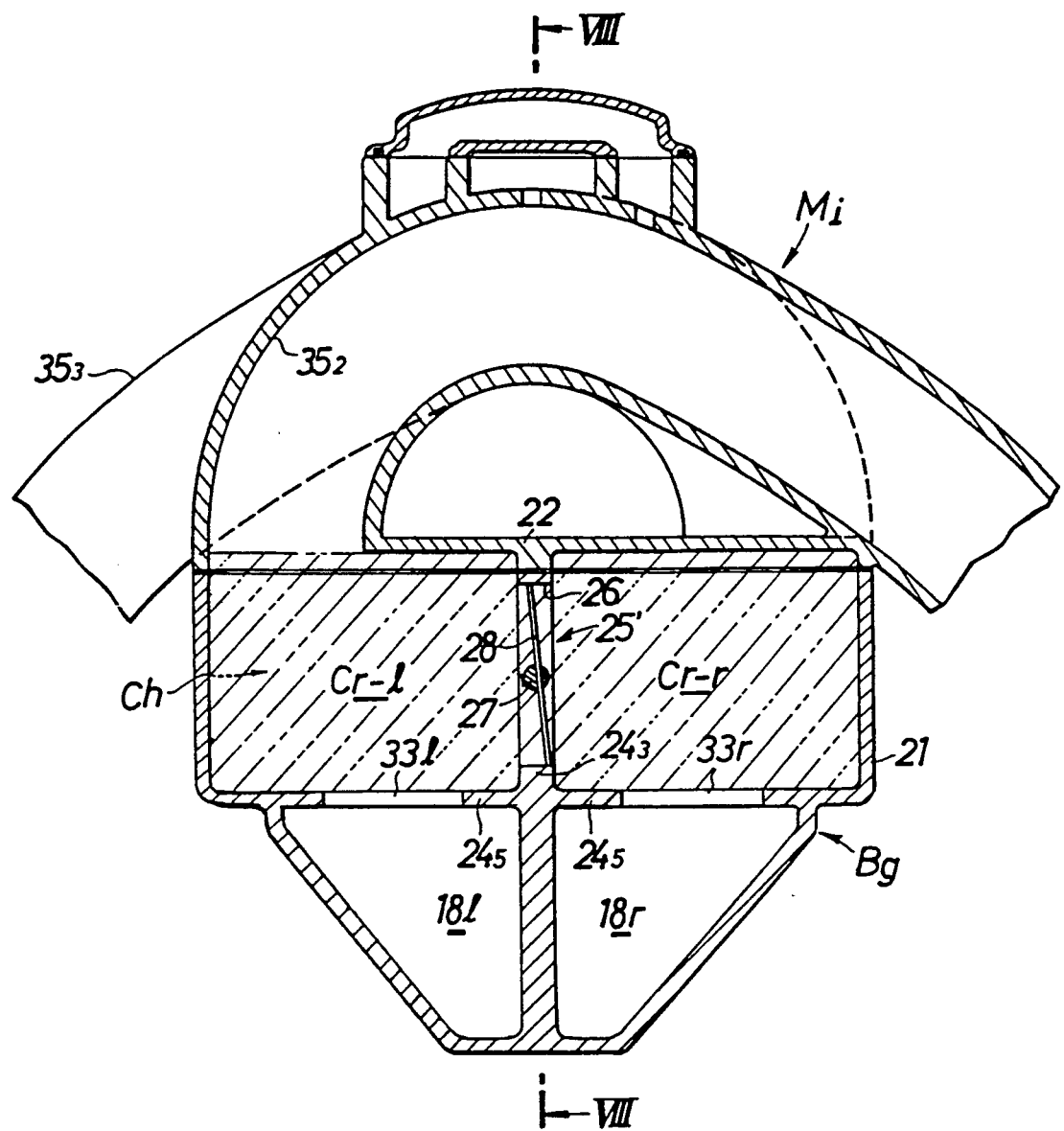
Figure 10:
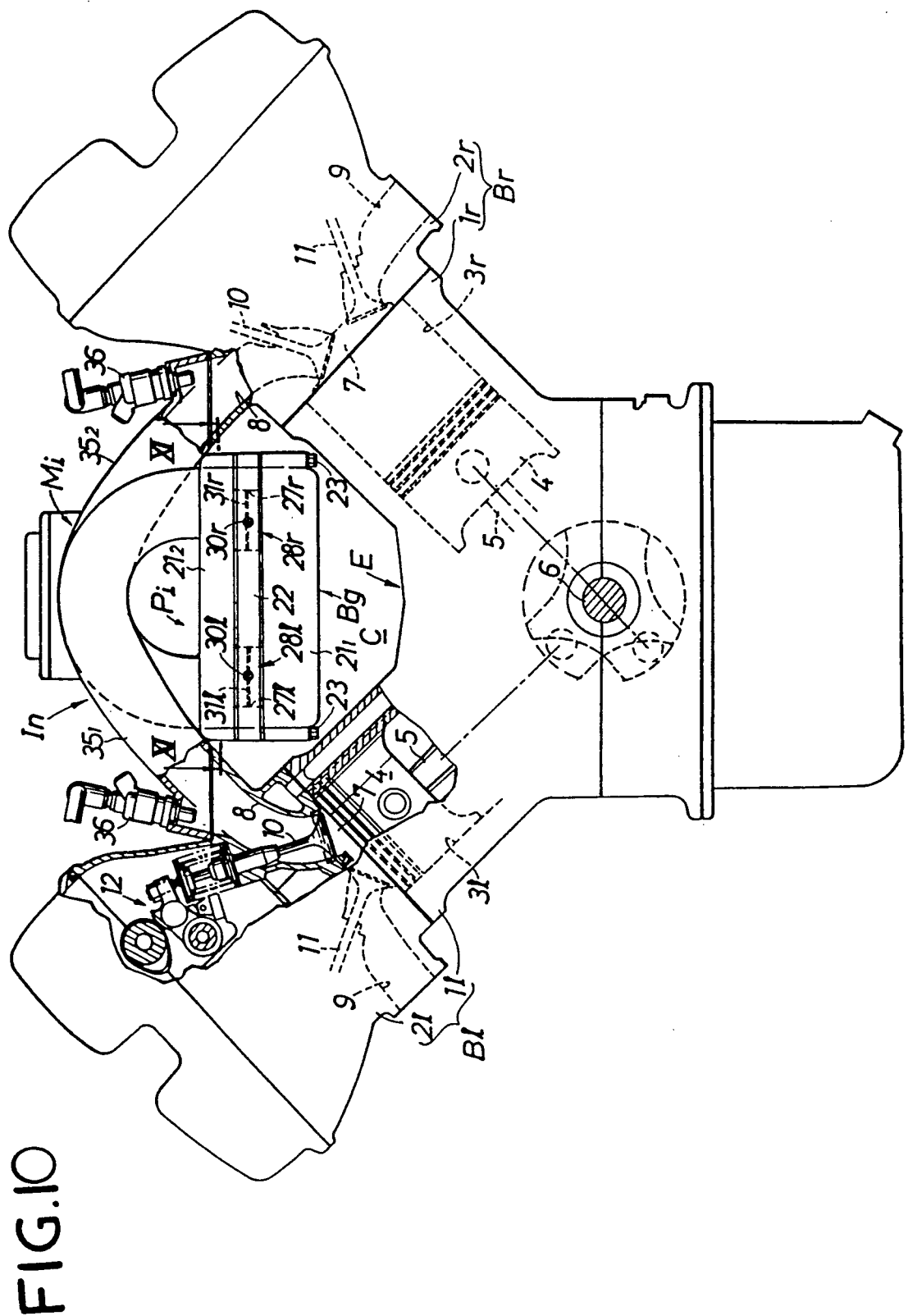

FIGS. 8 and 9 illustrate a modification of the second embodiment, wherein components corresponding to those in the previous second embodiment are designated by the same reference characters.

In this modification, a resonance chamber assembly box Bg is comprised of a pair of left and right resonance chambers Cr-l and Cr-r defined partitioned by a partition wall $24_3$ provided with an on-off valve 25', and a pair of resonance passages 18*l* and 18*r* defined below and in parallel to the resonance chambers Cr-l and Cr-r and divided from the resonance chambers by horizontal walls $24_5$ as a pair of dividing walls. A downstream end of a throttle body 15 communicates with upstream ends of the resonance passages 18*l* and 18*r* whose downstream ends communicate with the left and right resonance chambers Cr-l and Cr-r through left and right inlet ports 33*l* and 33*r* made in ends of the horizontal walls $24_5$.

Thus, even in this modification, it is possible to provide the same functioning effect as in the previous second embodiment. Particularly, this modification is available when it is required to reduce the transverse width of the resonance chamber assembly box Bg.

In the previously-described first embodiment, the resonance supercharge system is switched in the two-stage manner by putting the intermediate portions of the pair of resonance passages 18*l* and 18*r* into and out of communication with each other by the operation of the on-off valve 25, and in the second embodiment and the modification thereof, the resonance supercharge system and the inertia supercharge system are switched one from the other by putting the pair of resonance chambers Cr-l and Cr-r into and out of communication with each other by the operation of the on-off valve 25', but in short, given an intake system which comprises a pair of resonance chambers Cr-l and Cr-r and a pair of resonance passages 18*l* and 18*r* so as to enable the establishment of a resonance supercharge system, the present invention can be applied thereto and the on-off valve 25 or 25' may not necessarily be required. In addition, for a layout of the resonance chambers Cr-l and Cr-r and the resonance passages 18*l* and 18*r*, it is possible, in addition to those in the previous embodiments, to arrange a pair of resonance chambers Cr-l and Cr-r and a pair of resonance passages 18*l* and 18*r* in parallel in an overlapped relation.

FIGS. 10 to 13 illustrate a third embodiment. An intake system In of this embodiment is disposed within a V-space C between the left and right cylinder blocks 1*l* and 1*r* and comprises an air cleaner Ac, an intake passage Pi connected to an outlet of the air cleaner Ac, a resonance chamber assembly box Bg having a pair of left and right resonance chambers Cr-l and Cr-r and connected to a downstream end of the intake passage Pi, and an intake manifold Mi joined to those end faces of the left and right cylinder blocks 1*l* and 1*r* at which the intake ports 8 are opened, thereby permitting the communication between the left and right resonance chambers Cr-l and Cr-r and the right and left cylinder groups Cr and Cl, respectively.

Figure 11:
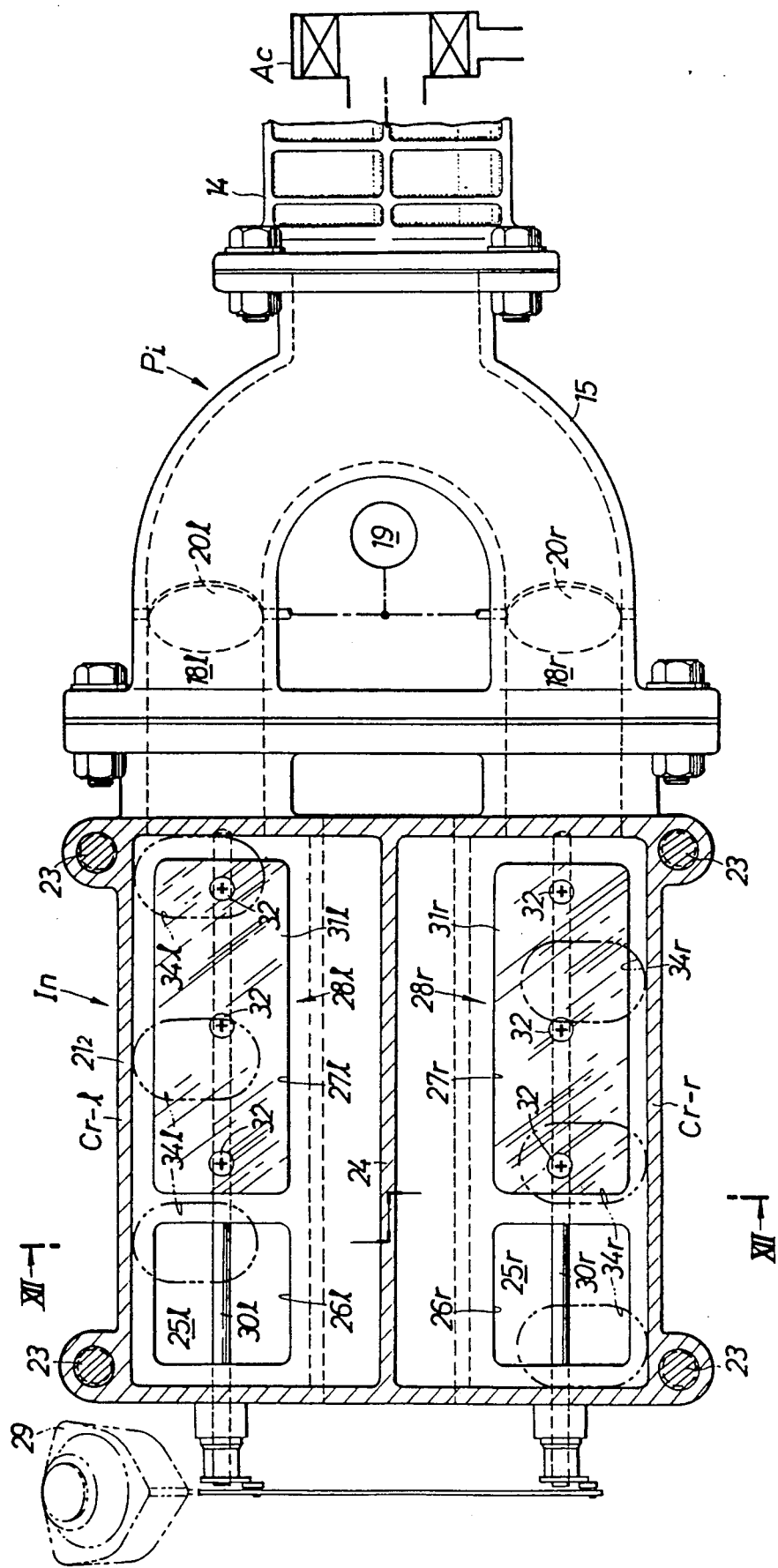

The intake passage Pi is constructed with a throttle body 15 being integrally connected to a downstream end of an intake passage 14 connected to the air cleaner Ac, as shown in FIG. 11. The intake passage 14 is formed into a hollow cylindrical shape so that an intake gas from the air cleaner Ac may be drawn thereinto, and the throttle body 15 is bifurcated, downstream its junction with the intake passage 14, into left and right branch passages 18*l* and 18*r*. Throttle valve 20*l* and 20*r* are mounted within the branch passages 18*l* and 18*r*, respectively and controlled for opening and closing by a common control 19. The resonance chamber assembly box Bg is integrally connected to a downstream end of the throttle body 15 by bolts 16.

Figure 12:
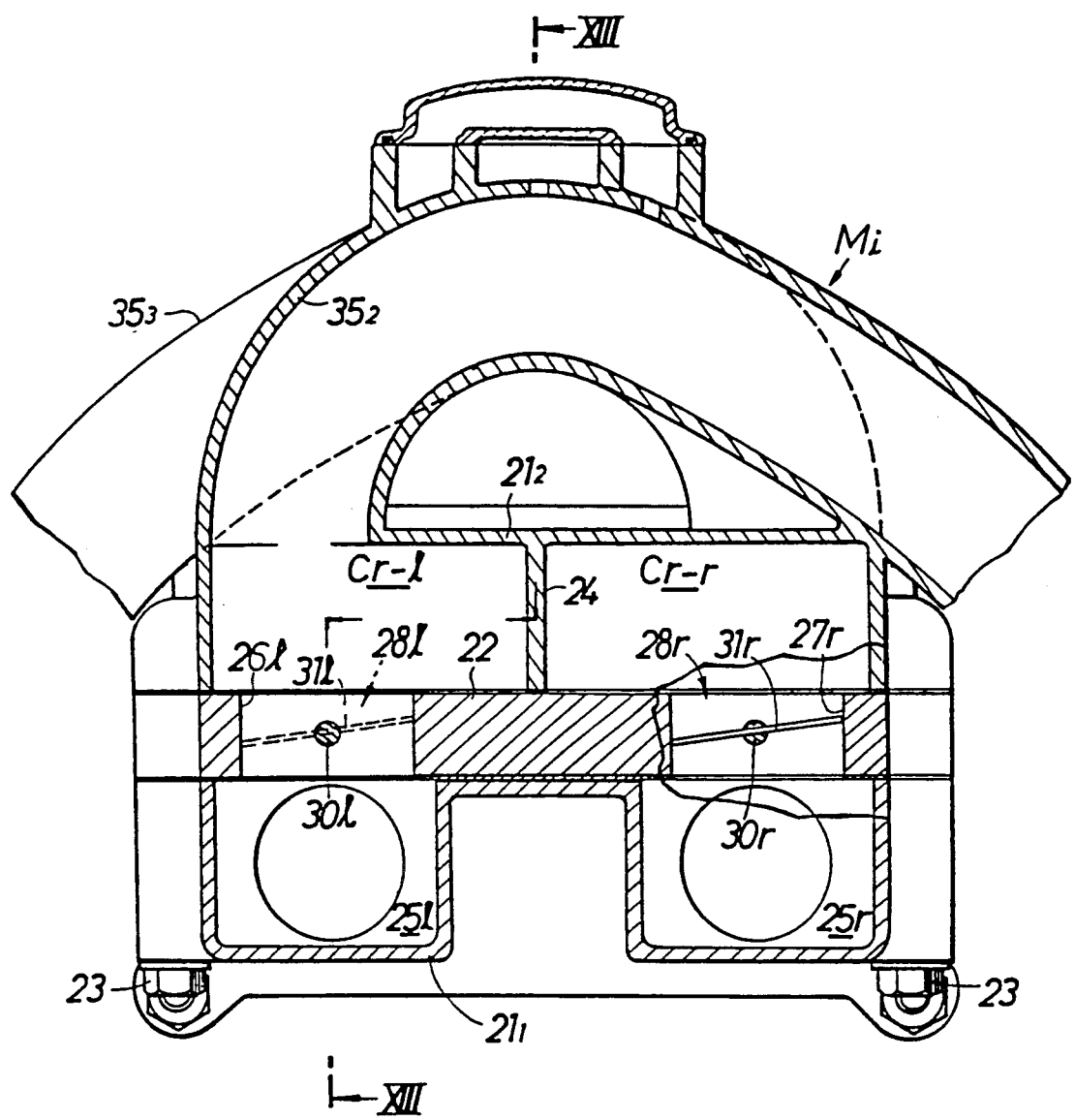
Figure 13:
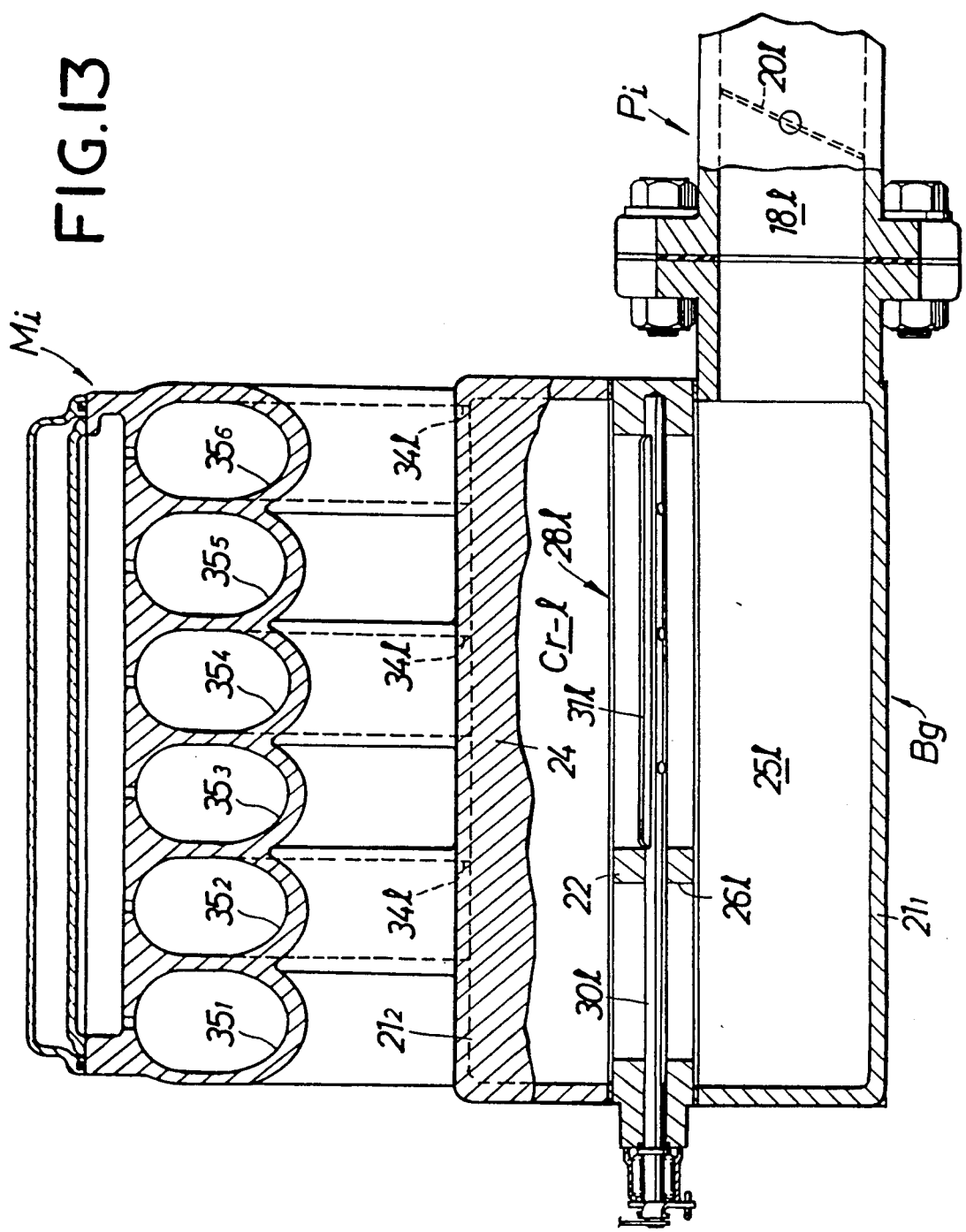

As seen from FIGS. 12 and 13, the resonance chamber assembly box Bg is comprised of a substantially rectangular parallelepiped-shaped lower assembly box portion $21_1$ opened at its upper surface and connected to the throttle body 15, a substantially rectangular parallelepiped-shaped upper assembly box portion $21_2$ opened at its lower surface and formed integrally with an intake manifold Mi, and a plate-like valve unit 22 air-tightly secured at its upper and lower surfaces to the opened surfaces of the assembly box portions $21_1$ and $21_2$ to provide a partition wall. These three components are assembled in a vertically stacked relation by bolts 23.

It can be seen from FIGS. 11 to 13 that the lower assembly portion $21_1$ of the resonance chamber assembly box Bg is divided into left and right resonance passages 25*l* and 25*r* extending in parallel to each other in a direction of a crank shaft 6 of an engine, i.e., in a direction of a flow of an intake gas within the box Bg.

Downstream ends of the left and right branch passages 18*l* and 18*r* of the throttle body 15 communicate with upstream ends of the left and right resonance passages 25*l* and 25*r*, respectively. The upper assembly box portion 21$_2$ is also divided into left and right parallel resonance chambers Cr-l and Cr-r by a partition wall 24. One of the resonance chambers Cr-l is located above corresponding one of the resonance passages 25*l*, and the other resonance chamber Cr-r is located above the other resonance passage 25*r*.

Opened in the valve unit 22 are left and right inlet ports 26*l* and 26*r* permitting upstream ends of the left and right resonance chambers Cr-l and Cr-r to communicate with downstream ends of the corresponding resonance passages 25*l* and 25*r*, respectively, and left and right valve bores 27*l* and 27*r* which short-circuit the left and right resonance chambers Cr-l and Cr-r and the resonance passages 25*l* and 25*r* at points short of the inlet ports 26*l* and 26*r*. The valve unit 22 is further provided with on-off valves 28*l* and 28*r* which are capable of opening the left and right valve bores 27*l* and 27*r* to short-circuit the left and right resonance chambers Cr-l and Cr-r and the resonance passages 25*l* and 25*r*. More specifically, two valve stems 30*l* and 30*r* are carried in the valve unit 22 to extend through central portions of inlet ports 26*l* and 26*r* and the valve bores 27*l* and 27*r* and adapted to be rotatably driven by a common actuator 29. Rectangular plate-like valve members 31*r* and 31*r* provided in the valve bores 27*l* and 27*r* are secured to the valve stems 30*l* and 30*r* by a machine screw 32. The actuator 29 is adapted to be controlled for operation in accordance with the operational condition of the engine, so that the on-off valves 28*l* and 28*r* may be controlled for opening and closing. For example, during a lower speed operation of the engine, the on-off valve 28*l* and 28*r* may be closed, and during a higher speed operation of the engine, the on-off valve 28*l* and 28*r* may be closed.

Three elliptically-shaped left and right exhaust ports 34*l* and 34*r* are opened in upper walls of the left and right resonance chambers Cr-l and Cr-r along their longitudinal axis. The three exhaust ports 34*l* of the left resonance chamber Cr-l communicate with the three cylinders 3*r* (in which the intake sequence is not continuous), respectively, in the right cylinder block 1*r* located on the opposite side from the left resonance chamber Cr-l through the intake manifold Mi, and the three exhaust ports 34*r* of the right resonance chamber Cr-r likewise communicate with the three cylinders 3*l* (in which the intake sequence is not continuous), respectively, in the left cylinder block 1*r* located on the opposite side from the right resonance chamber Cr-r through the intake manifold Mi.

The operation of the third embodiment will be described below.

The actuator 29 is controlled for operation in accordance with the operational condition of the engine. For example, in a lower speed operation condition of the engine, the on-off valves 28*l* and 28*r* are controlled to be closed as shown by a solid line in FIGS. 11 to 13 to close their valve bores 27*l* and 27*r*, so that the communication of the resonance passages 25*l* and 25*r* corresponding to the left and right resonance chambers Cr-l and Cr-r is cut off. In this state, there are established two series of intake systems which are comprises of the branch passages 18*l* and 18*r* for each cylinder group, the resonance passages 25*l* and 25*r* for each cylinder group, left and right resonance chambers Cr-l and Cr-r for each cylinder group, and left and right distributor pipes 35$_1$, 35$_2$, 35$_3$, 35$_4$, 35$_5$ and 35$_6$ for each cylinder group, i.e., two series of resonance supercharge intake systems which produce no suction interference and each extend from the three cylinders 3*l*, 3*r* to the outlet of the throttle body 15. The length of such intake system is relatively long and moreover, the volume of the resonance chambers Cr-l and Cr-r is set such that the natural frequency of the resonance supercharge system may substantially accord with the period of opening and closing of each intake valve 10 in a lower speed rotation region of the engine. This ensures that a resonance supercharge effect is effectively accomplished to increase the volume efficiency in the lower speed rotation region of the engine.

When the engine has been brought into a higher speed operation, the actuator 29 is operated to open the left and right on-off valve 28*l* and 28*r*, so that the left and right resonance chambers Cr-l and Cr-r and the resonance passages 25*l* and 25*r* which has been hitherto in communication with each other through the inlet ports 26*l* and 26*r* are short-circuited. This reduces the substantial length of the resonance passages 25*l* and 25*r* and causes the resonance passages 25*l* and 25*r* to serve as portions of the resonance chambers Cr-l and Cr-r, thereby increasing the volume of the resonance chambers Cr-l and Cr-r to ensure that the natural frequency of the resonance supercharge system is increased so as to substantially accord with the period of opening and closing of each intake valve 10 in the higher speed operation region of the engine. As a result, the resonance supercharge effect is effectively accomplished to increase the volume efficiency in the higher speed rotation region of the engine.

By permitting the left and right resonance chambers Cr-l and Cr-r and the resonance passages 25*l* and 25*r* provided in the resonance assembly box Bg to be short-circuited and put out of communication with each other through the on-off valves 28*l* and 28*r* as described above, it is possible to provide a higher volume efficiency in a wider operation range of the engine from a lower speed to a higher speed. In addition, since the resonance chamber assembly box Bg is comprised of the upper and lower assembly box portions 21$_2$ and 21$_1$ vertically stacked and the valve unit 22, with the left and right resonance chambers Cr-l and Cr-r being defined in the upper assembly box portion 21$_2$, with the resonance passages 25*l* and 25*r* being defined in the lower assembly box portion 21$_1$ and with the inlet ports 26*l* and 26*r* and the on-off valves 28*l* and 28*r* being provided in the valve unit 22, it is possible to form the resonance chamber assembly box Bg extremely compactly and to reduce the manufacturing cost thereof.

A fourth embodiment of the present invention will be described below with reference to FIG. 14.

Figure 14:
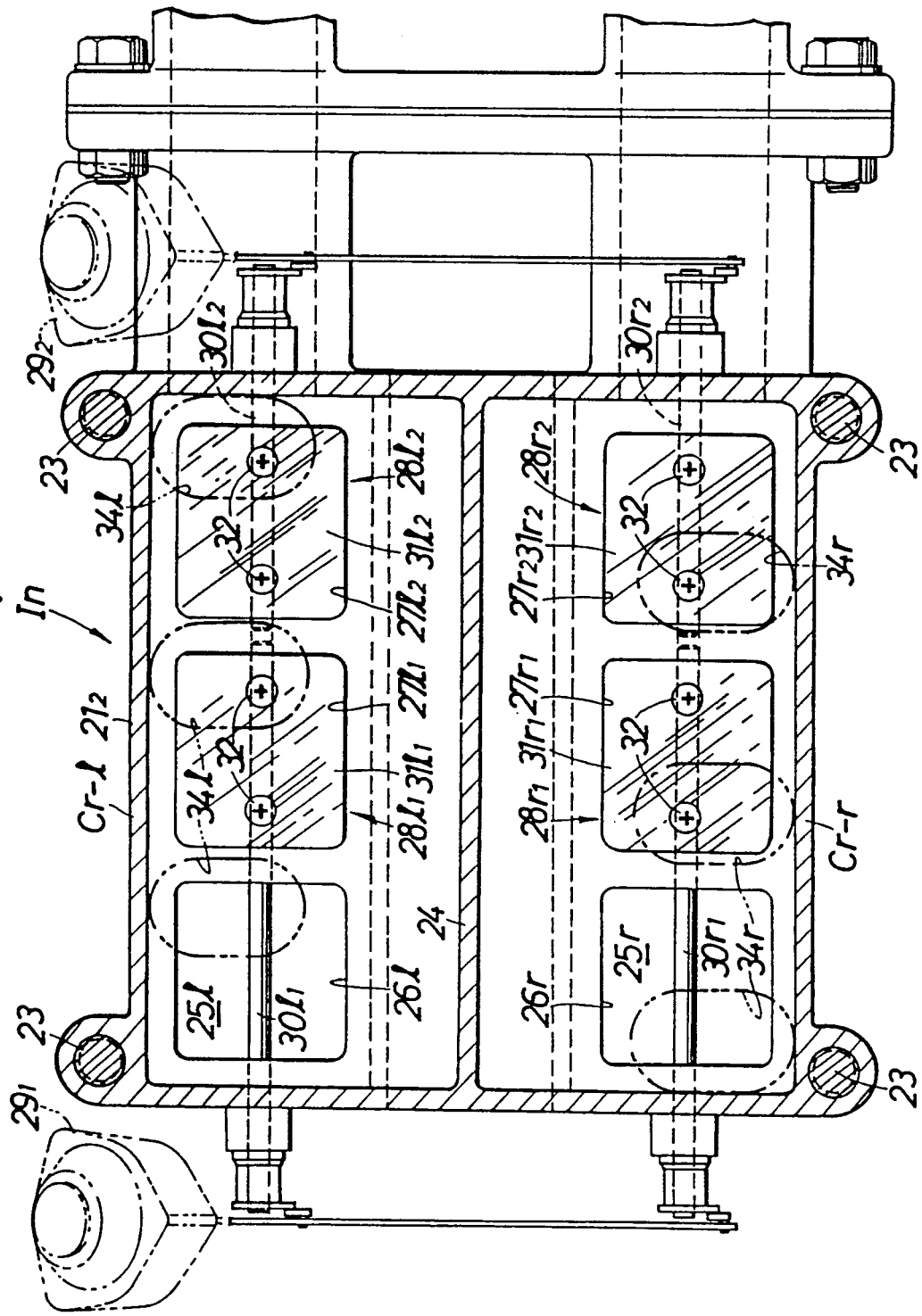
FIG. 14 is a sectional view of an intake system, similar to FIG. 11, but illustrating a fourth embodiment of the present invention.

FIG. 14 is a sectional view of the same intake system as in FIG. 11, wherein the same reference characters as in the previous embodiment designate the same components.

In the fourth embodiment, two on-off valves 28*l*$_1$, 28*l*$_2$; and 28*r*$_1$, 28*r*$_2$ are used into which are divided the left and right on-off valves 28*l* and 28*r* for short-circuiting the left and right resonance chambers Cr-l and Cr-r and the resonance passages 25*l* and 25*r* described in the previous embodiments, respectively. The on-off valves 28*l*$_1$ and 28*r*$_1$ are mounted on valve stems 30*l*$_1$ and 30*r*$_1$ rotatably driven by an actuator 29$_1$, respectively and the on-off valves 28*l*$_2$ and 28*r*$_2$ are mounted on valve stems $30l_2$ and $30r_2$ rotatably driven by an actuator $29_2$, respectively.

According to this embodiment, all the on-off valves $28l_1$, $28r_1$; $28l_2$, $28r_2$ are closed in a lower speed rotation region of the engine, as in the previous embodiments, and the volume efficiency is increased in such lower speed rotation region. In a middle speed rotation region of the engine, one of the actuators $29_1$ is driven to open the on-off valves $28l_1$ and $28r_1$ closer to the inlet ports $26l$ and $26r$. This reduces the substantially length of the resonance passages $25l$ and $25r$ slightly and causes portions of the resonance passages $25l$ and $25r$ to serve as portions of the resonance chambers Cr-l and Cr-r, thereby slightly increasing the substantial volume of the resonance chambers Cr-l and Cr-r to ensure that the natural frequency of the resonance supercharge system is increased to substantially correspond with the period of opening and closing of each intake valve 10. Further, in a higher speed operation region of the engine, both the actuators $29_1$ and $29_2$ are driven to open all the on-off valves $28l_1$, $28r_1$, $28l_2$ and $28r_2$ as in the previous embodiment, thereby increasing the volume efficiency in such higher speed rotation region.

According to the fourth embodiment, the natural frequency of the resonance supercharge system can be switched at three stages in this manner and therefore, the resonance supercharge effect is effectively accomplished in a wider range of from a lower speed operation region to a higher speed operation region to increase the volume efficiency of the engine.

A fifth embodiment of the present invention will be described below with reference with FIGS. 15 and 16.

Figure 15:
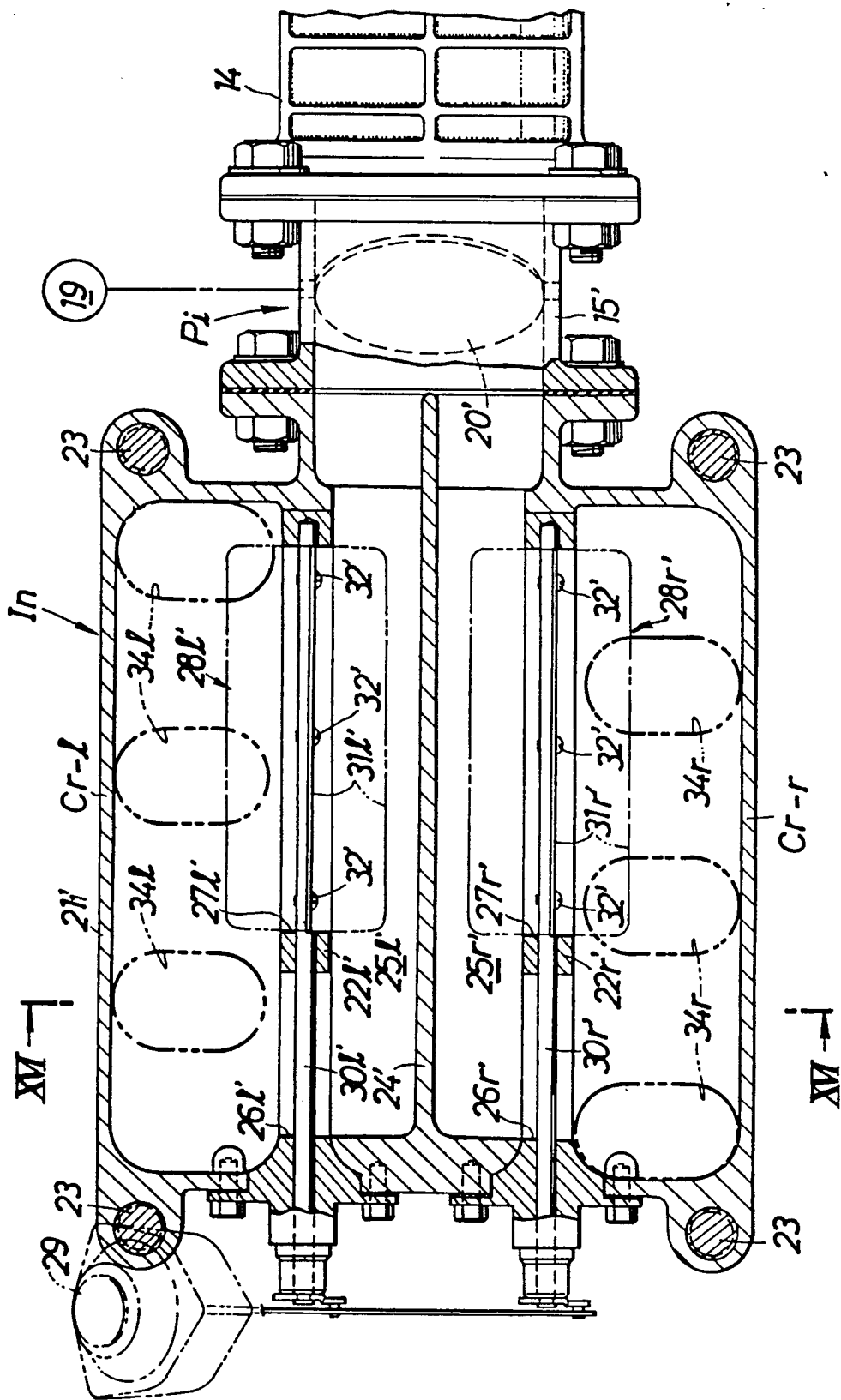
FIGS. 15 and 16 illustrate a fifth embodiment of the present invention, FIG. 15 being a sectional view of an intake system, similar to FIG. 11, and FIG. 16 being a sectional view taken along a line XVI—XVI in FIG. 15.
Figure 16:
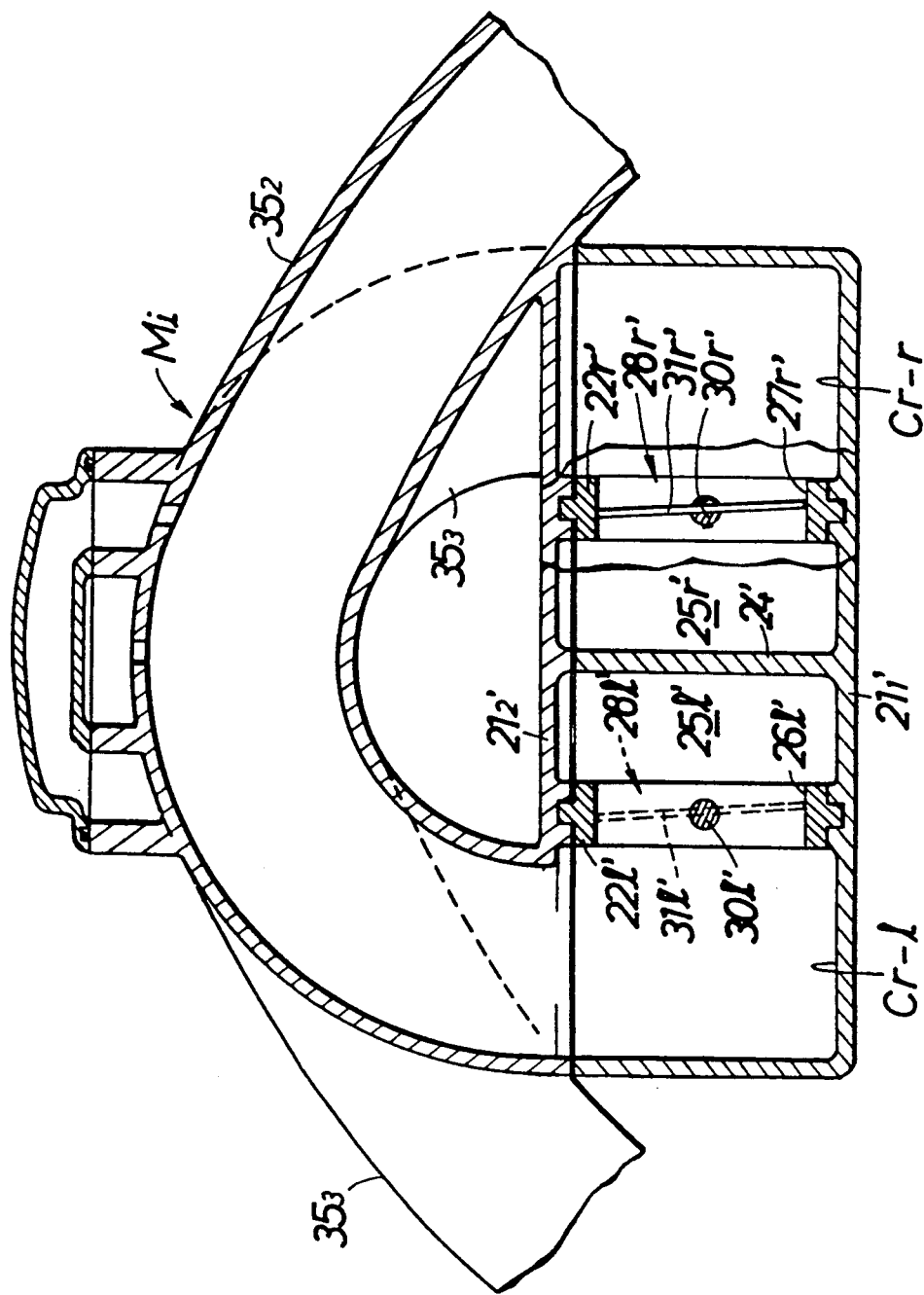
Figure 17:
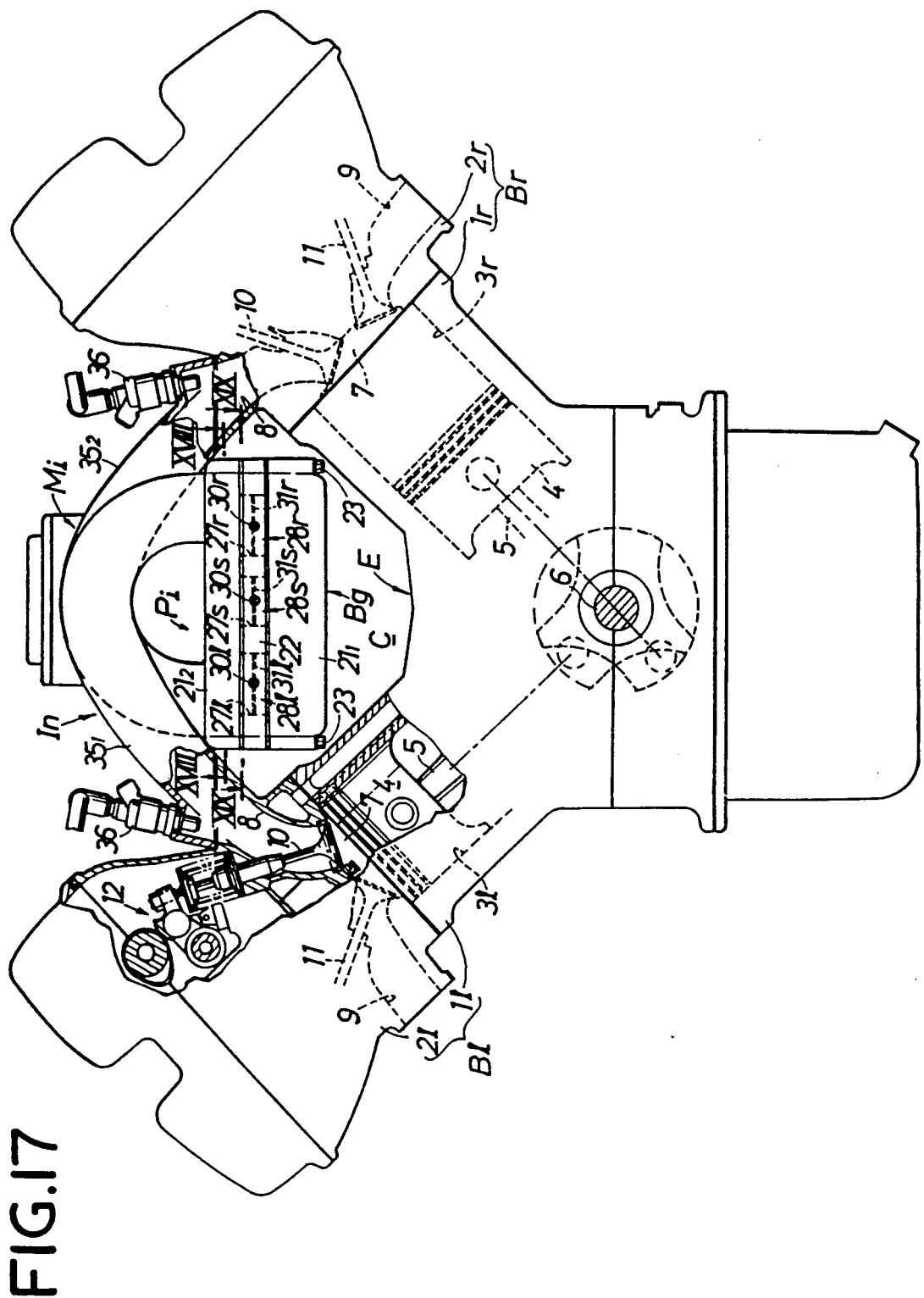

FIGS. 15 and 16 are sectional views of the same intake system as in FIGS. 11 and 12, wherein the same reference characters denotes the same components.

In the fifth embodiment, a resonance chamber assembly box Bg connected to a downstream end of a throttle body 15' including a throttle valve 20' provided therein is comprised of an assembly body $21_1'$ and a lid $21_2'$ covering an upper surface of the body $21_1'$. The interior of the resonance chamber assembly box Bg is divided laterally by a dividing wall 24' extending longitudinally of the crankshaft 6. A pair of valve units $22l'$ and $22r'$ forming a partition wall are mounted on the left and right sides of the dividing wall 24' and sandwiched vertically between the assembly box body $21_1'$ and the lid $21_2'$, and a pair of resonance passages $25l'$ and $25r'$ are defined between the left and right valve units $22l'$ and $22r'$ and the dividing wall 24'. A left Cr-l and a right resonance chamber Cr-r are defined outside the left and right valve units $22l'$ and $22r'$, and the two resonance chambers Cr-l and Cr-r communicate with downstream ends of the resonance passages $25l'$ and $25r'$ through inlet ports $26l'$ and $26r'$ made in the valve units $22l'$ and $22r'$, respectively.

Valve bores $27l'$ and $27r'$ are opened in the valve units $22l'$ and $22r'$, respectively, and on-off valves $28l'$ and $28r'$ are mounted for opening and closing in the valve bores $27l'$ and $27r'$ and connected to an actuator 29'. The on-off valves $28r'$ and $28l'$ have the same structure as the on-off valves $28l$ and $28r$ in the previous embodiments, i.e., a structure with a rectangular valve members $31l'$ and $31r'$ secured by machine screws 32' to valve stems $30l'$ and $30r'$ extending through the valve bores $27l'$ and $27r'$ made in the valve units $22l'$ and $22r'$.

According to this embodiment, the on-off valves $28l'$ and $28r'$ are closed in a lower speed operation region of the engine, so that the left and right resonance passages $25l'$ and $25r'$ are put into communication through their entire lengths with the left and right resonance chambers Cr-l and Cr-r. This establishes a resonance supercharge intake system having an increased passage length and a smaller natural frequency to increase the volume efficiency in a lower speed rotation region.

When the engine has been brought into a higher speed operation, the actuator 29 is operated to open the left and right on-off valves $28l'$ and $28r'$, so that the left and right resonance chambers Cr-l and Cr-r and the resonance passages $25l'$ and $25r'$ which have been hitherto in communication with each other through the inlet ports $26l'$ and $26r'$ are short-circuited through the valve bores $27l'$ and $27r'$ to reduce the substantial length of the resonance passages $25l'$ and $25r'$, and the resonance passages $25l'$ and $25r'$ serve as portions of the resonance chambers Cr-l and Cr-r to increase the substantial volume of the chambers Cr-l and Cr-r and enhance the volume efficiency in the higher speed rotation region.

Even in the fifth embodiment, it is possible to simplify and reduce the size of the structure of the intake system by virtue of a reasonable layout of the resonance passages $25l'$ and $25r'$, the resonance chambers Cr-l and Cr-r, the valve units $22l'$ and $22r'$ and the on-off valves $28l'$ and $28r'$.

FIGS. 17 to 21 illustrate a sixth embodiment of the present invention. In this embodiment, an intake system In is disposed within a V-space C between left and right cylinder blocks $1l$ and $1r$ and comprises an air cleaner Ac, an intake passage Pi connected to an outlet of the air cleaner Ac, a resonance chamber assembly box Bg including a pair of left and right resonance chambers Cr-l and Cr-r, and an intake manifold Mi joined to that end faces of the left and right cylinder blocks $1l$ and $1r$ to which an intake port 8 is opened, thereby permitting the communication between the left and right resonance chambers Cr-l and Cr-r and the left and right cylinder groups Cr and Cl.

Figure 18:
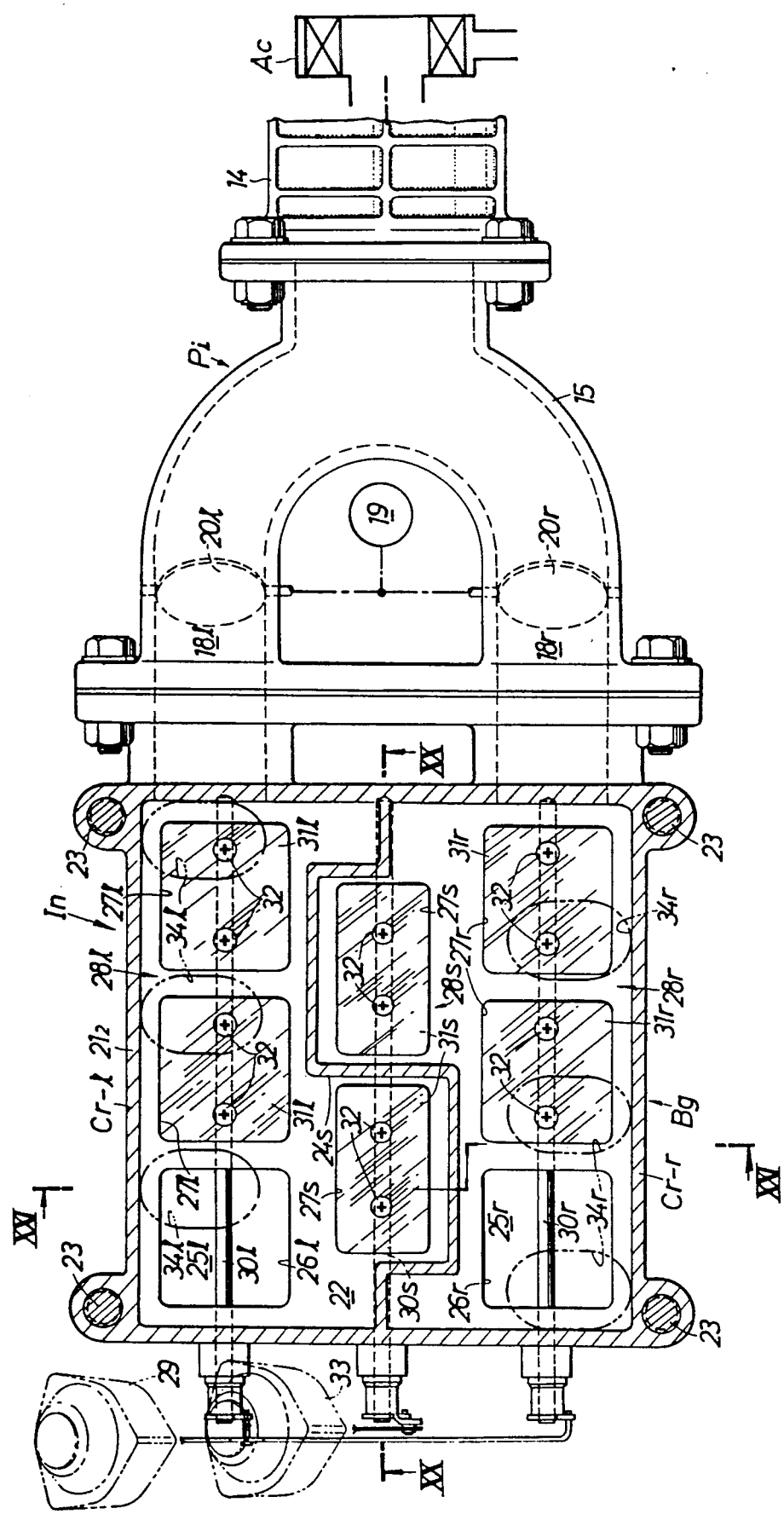
Figure 19:
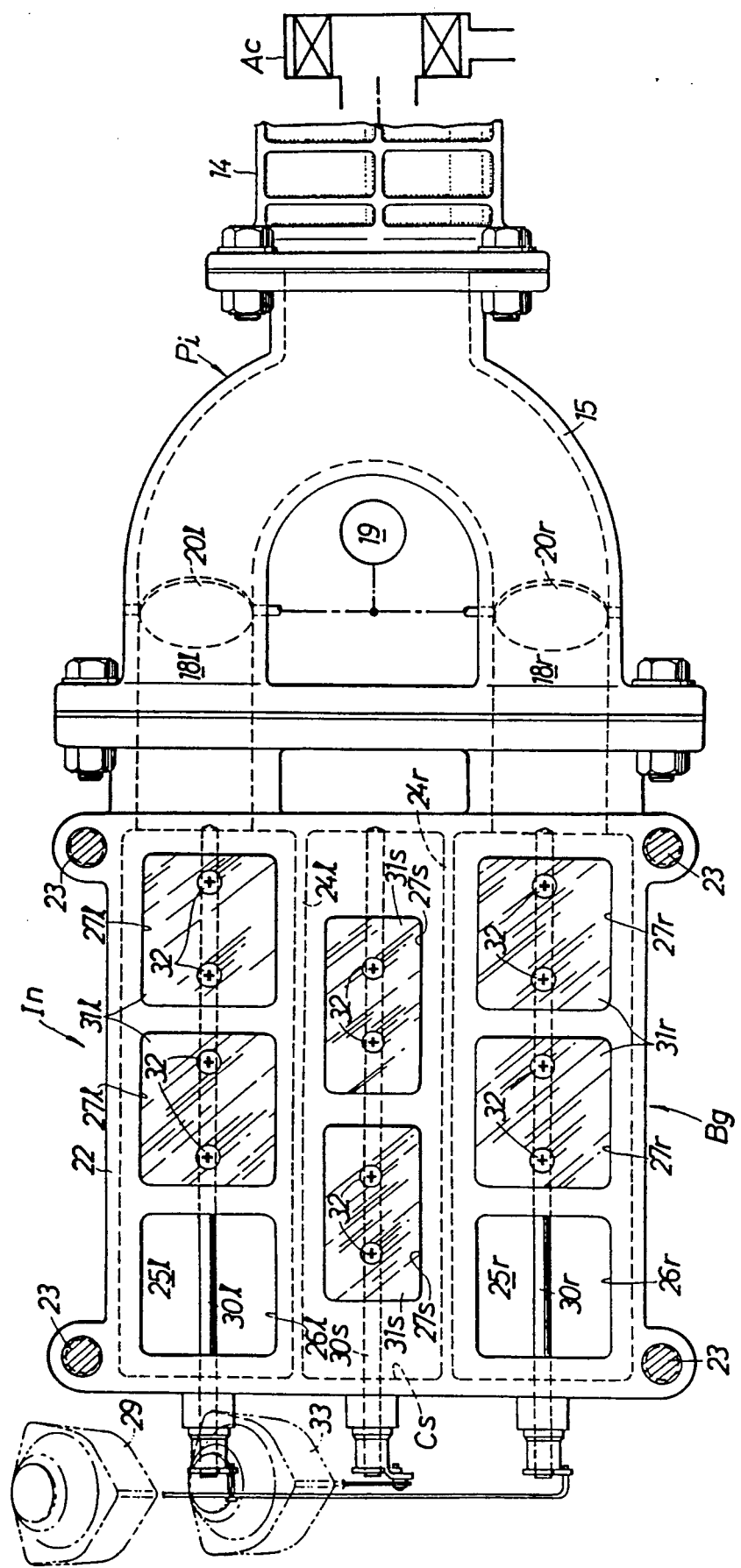

The passage Pi is constructed with a throttle body 15 integrally connected to a downstream end of an intake passage 14 connected to the air cleaner Ac, as shown in FIG. 18. The intake passage 14 is formed into a hollow cylindrical shape so that an intake gas may be drawn thereinto from the air cleaner Ac. The throttle body 15 is bifurcated into left and right branch passages $18l$ and $18r$ downstream its connection with the intake passage 14, and throttle valves $20l$ and $20r$ are provided in the branch passages $18l$ and $18r$ and controllable for opening and closing by a common control 19. The resonance chamber assembly box Bg is integrally connected to a downstream end of the throttle body 15 by bolts 16.

Figure 20:
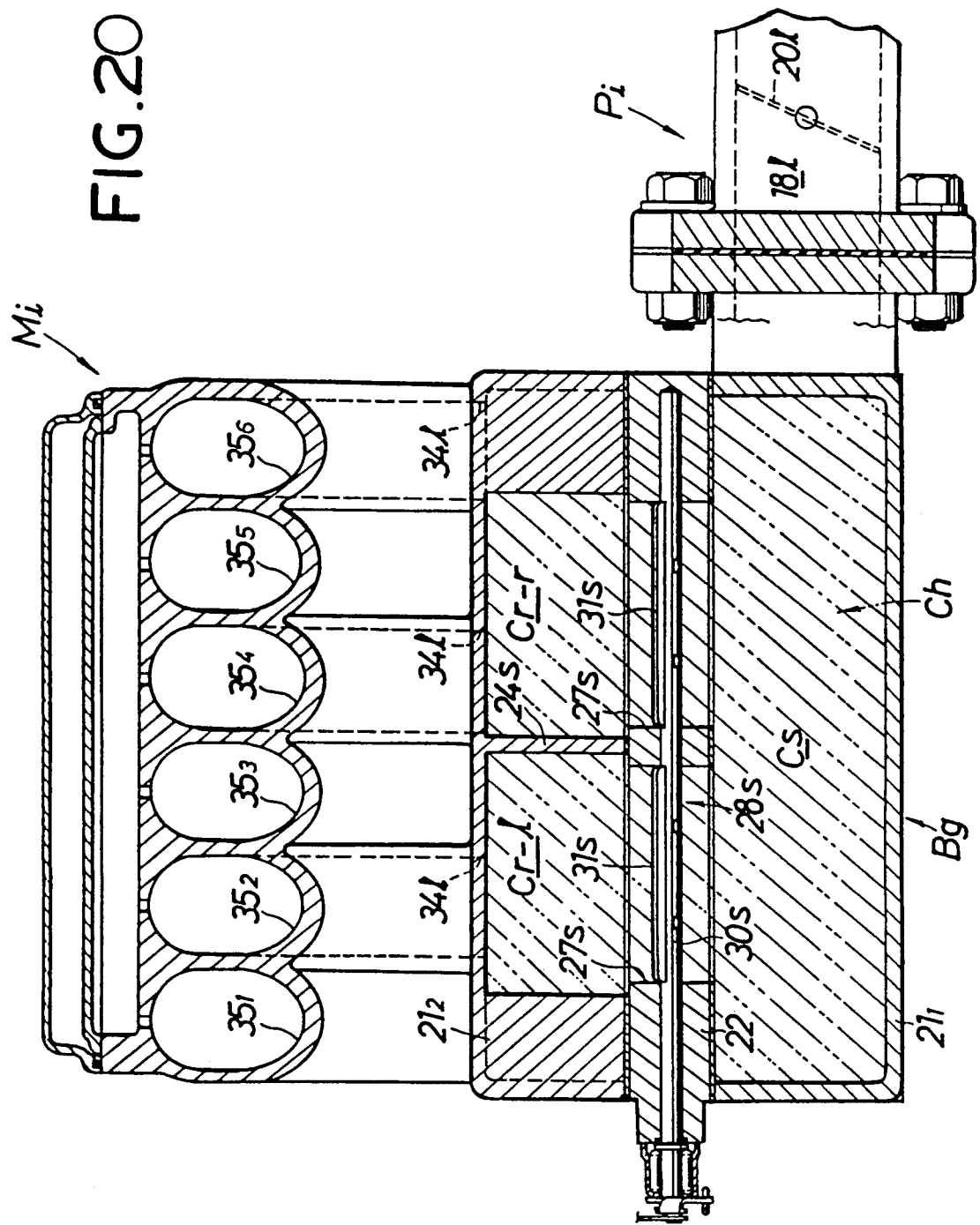
Figure 21:
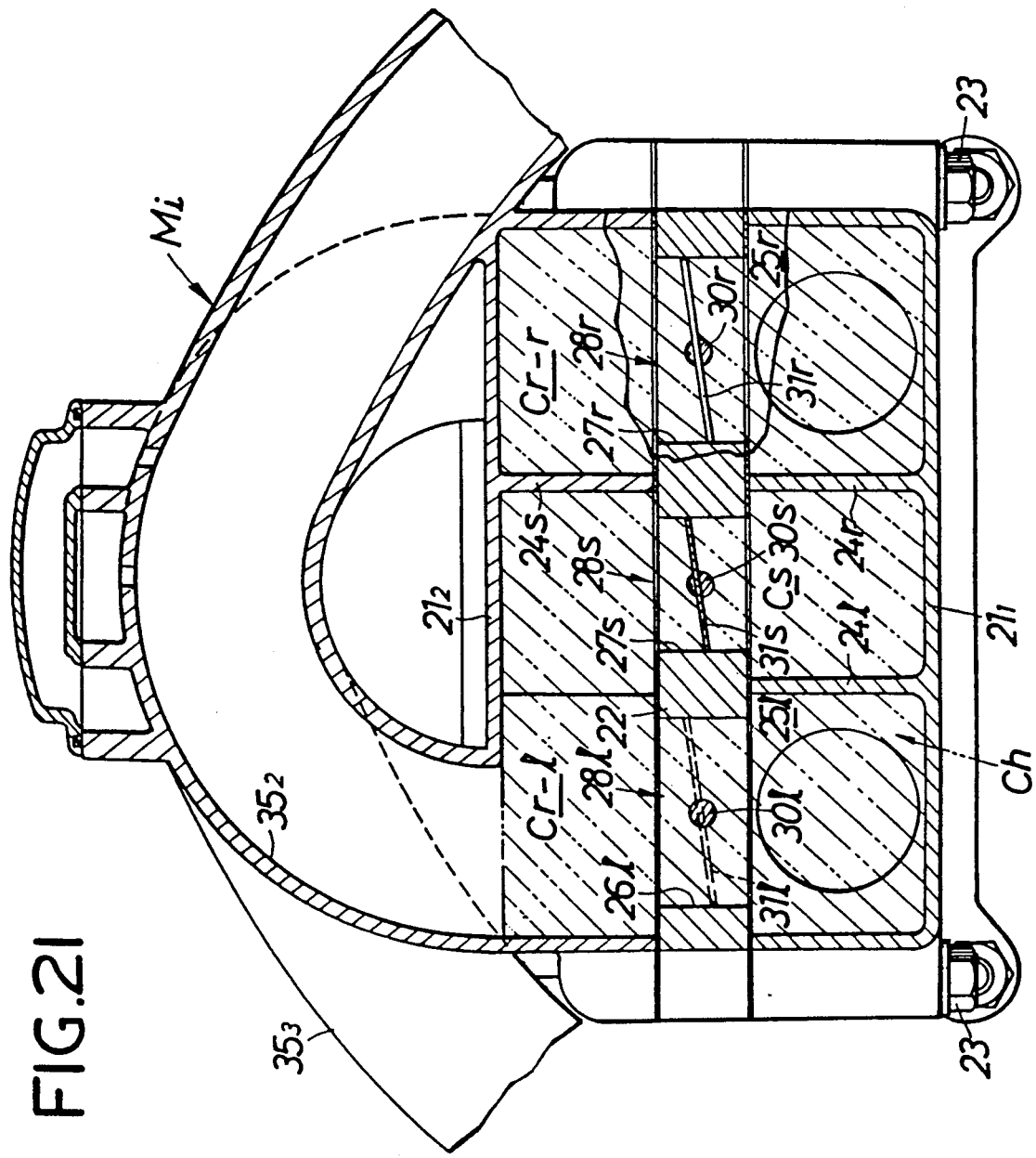

It can be seen from FIGS. 20 and 21 that the resonance chamber assembly box Bg is comprised of a substantially rectangular parallelepiped-shaped lower assembly box portion $21_1$ opened at its upper surface and connected to the throttle body 15, a substantially rectangular parallelepiped-shaped upper assembly box portion $21_2$ opened at its lower surface and formed integrally with an intake manifold Mi, and a plate-like valve unit 22 air-tightly secured at its upper and lower surfaces to the opened surfaces of the assembly box portions $21_1$ and $21_2$. These three components are assembled in a vertically stacked relation by bolts 23.

It can be seen from FIGS. 18 to 21 that the lower assembly portion $21_1$ of the resonance chamber assembly box Bg is divided into left and right resonance passages $25l$ and $25r$ parallel to each other and a communication chamber portion Cs as communication passages located between the left and right resonance passages 25*l* and 25*r* by two partition walls 24*l* and 24*r* extending in a direction of a crank shaft 6 of an engine, i.e., in a direction of a flow of an intake gas within the box Bg. Downstream ends of the left and right branch passages 18*l* and 18*r* of the throttle body 15 communicate with upstream ends of the left and right resonance passages 25*l* and 25*r*, respectively. The upper assembly box portion 21$_2$ is also divided into left and right parallel resonance chambers Cr-l and Cr-r by a partition wall 24*s* curved like a crank. Such curved portion of the partition wall 24*s* is located just above the communication chamber portion Cs defined in the lower assembly box portion 21$_1$.

Opened in the valve unit 22 are left and right inlet ports 26*l* and 26*r* permitting upstream ends of the left and right resonance chambers Cr-l and Cr-r to communicate with downstream ends of the corresponding resonance passages 25*l* and 25*r*, respectively, left and right two valve bores 27*l* and 27*r* which short-circuit the left and right resonance chambers Cr-l and Cr-r and the resonance passages 25*l* and 25*r* at points short of the inlet ports 26*l* and 26*r*, and two valve bores 27*s* permitting left and right resonance chambers Cr-l and Cr-r to communicate with each other through the communication chamber portion Cs. The valve unit 22 is further provided with on-off valves 28*l* and 28*r* capable of opening the left and right two valve bores 27*l* and 27*r* to short-circuit the left and right resonance chambers Cr-l and Cr-r and the resonance passages 25*l* and 25*r*, and an on-off valve 28*s* capable of opening the valve bore 27*s* to put the left and right resonance chambers Cr-l and Cr-r into integral communication with each other through the communication chamber Cs. More specifically, two left and right valve stems 30*l* and 30*r* are carried in the valve unit 22 to extend through central portions of inlet ports 26*l* and 26*r* and the valve bores 27*l* and 27*r* and adapted to be rotatably driven by a common actuator 29. Rectangular plate-like valve members 31*l* and 31*r* provided in the valve bores 27*l* and 27*r* are secured to the valve stems 30*l* and 30*r* by machine screws 32. A central valve stem 30*s* is also carried in the valve unit 22 to extend through the central valve bore 27*s* and adapted to be rotatably driven by another actuator 33, and a rectangular plate-like valve member 31*s* provided in the valve bore 27*s* is secured to the valve stem 30*s* by machine screws 32. The two actuators 29 and 33 are adapted to be controlled for operation in accordance with the operational condition of the engine, so that the opening and closing of the on-off valves 28*l*, 28*r* and 28*s* may be controlled.

Three elliptically-shaped left and right exhaust ports 34*l* and 34*r* are opened in upper walls of the left and right resonance chambers Cr-l and Cr-r along their longitudinal axis. The three exhaust ports 34*l* of the left resonance chamber Cr-l communicate with the three cylinders 3*r* (in which the suction sequence is not continuous), respectively, in the right cylinder block 1*r* located on the opposite side from the left resonance chamber Cr-l through the intake manifold Mi, and the three exhaust ports 34*r* of the right resonance chamber Cr-r likewise communicate with the three cylinders 3*l* (in which the suction sequence is not continuous), respectively, in the left cylinder block 1*l* located on the opposite side from the right resonance chamber Cr-r through the intake manifold Mi.

The operation of the sixth embodiment will be described below.

The two actuator 29 and 33 are controlled for operation in accordance with the operational condition of the engine. For example, in a low-leveled lower speed operation condition in which the rotational speed of the engine is extremely low, all the on-off valves 28*l*, 28*r* and 28*s* are controlled to be closed as shown by a solid line in FIGS. 18 to 21 to close their valve bores 27*l*, 27*r* and 27*s*, the communication of the left and right resonance chambers Cr-l and Cr-r is cut off, and the communication of the resonance passages 25*l* and 25*r* corresponding to the left and right resonance chambers Cr-l and Cr-r is also cut off. In this state, there are established two series of intake systems which are comprised of the branch passages 18*l* and 18*r* for each cylinder group, the resonance passages 25*l* and 25*r* for each cylinder group, left and right resonance chambers Cr-l and Cr-r for each cylinder group, and left and right distributor pipes 35$_1$, 35$_2$, 35$_3$, 35$_4$, 35$_5$ and 35$_6$ for each cylinder group, i.e., two series of resonance supercharge intake system which produce no suction interference and each extend from the three cylinders 3*l* and 3*r* to the outlet of the throttle body 15. Moreover, the volume of the resonance chambers Cr-l and Cr-r is set such that the natural frequency of the resonance supercharge system may accord with the period of opening and closing of each intake valve 10 in the low-leveled lower speed rotation region of the engine and hence, the resonance supercharge effect is effectively accomplished to increase the volume efficiency in the low-leveled lower speed rotation region of the engine.

When the rotational speed of the engine has been slightly increased into a high-leveled lower speed operational condition in which the rotational speed of the engine is higher than the low-leveled lower speed operation condition but lower than the middle speed operational condition, the actuator 29 is operated to open the left and right on-off valves 28*l* and 28*r*, thereby permitting the left and right resonance chambers Cr-l and Cr-r and the resonance passages 25*l* and 25*r* which have been hitherto in communication through the inlet ports 26*l* and 26*r* to be short-circuited through the valve bores 27*l* and 27*r*. This reduces the substantial length of the resonance passages 25*l* and 25*r* to increase the natural frequency of the resonance supercharge system so as to substantially accord with the period of opening and closing of each intake valve 10 in the high-leveled lower speed rotation region of the engine. As a result, the resonance supercharge effect is effectively accomplished to increase the volume efficiency in the high-leveled lower speed rotation region of the engine.

When the engine has been brought into a higher speed rotational condition, the actuator 33 is further operated to open the on-off valve 28*s* to put the left and right resonance chambers Cr-l and Cr-r and the communication chamber Cs into communication with one another through the two valve bores 27*s*, thereby establishing an inertia supercharge distributing chamber Ch of a larger volume shown by a two-dashed line in FIGS. 20 and 21, which commonly communicates with the left and right three cylinders 3*l* and 3*r*. In this state, the above-described two series of resonance intake systems are cancelled and instead, an inertia supercharge system is established with a negative pressure wave produced in an intake stroke of the engine being reflected and turned in the larger volume inertia supercharge distributing chamber Ch and with a positive pressure wave being propagated to the intake port 8 of each cylinder 3l, 3r. Moreover, the passage length of propagation of the negative positive pressure wave is reduced to enable the period of intake pressure to accord with the period of opening and closing of intake valve 10 during a high speed rotation of the engine. At this time, proper setting of the volume of the communication chamber Cs makes it possible to insure a larger volume of the inertia supercharge distributing chamber Ch required to enhance the inertia supercharge effect in a high speed rotation region of the engine, thereby effectively accomplishing the inertia supercharge effect in such operational region to increase the volume efficiency. If should be noted that even if the on-off valves 28l and 28r are in any of opened and closed states in such higher speed rotational region of the engine, there is no substantial influence, because the two series of resonance intake systems have been already cancelled and the inertia supercharge system has been established.

By putting the left and right resonance chambers Cr-l and Cr-r and the resonance passages 25l and 25r provided in the resonance assembly box Bg or the left and right resonance chambers Cr-l and Cr-r into and out of communication with each other through the on-off valves 28l, 28r and 28s as described above, it is possible to provide a higher volume efficiency in a wider operation range of from a lower speed to a higher speed. In addition, since the resonance chamber assembly box Bg is comprised of the vertically stacked upper and lower assembly box portions $21_2$ and $21_1$, and the valve unit 22, with the left and right resonance chambers Cr-l and Cr-r being defined in the upper assembly box portion $21_2$, with the pair of resonance passages 25l and 25r and the communication chamber being defined in the lower assembly box portion $21_1$ and with the inlet ports 26l and 26r and the on-off valves 28l, 28r and 28s being provided in the valve unit 22, it is possible to form the resonance chamber assembly box Bg extremely compactly and moreover to reduce the manufacturing cost thereof.

A seventh embodiment of the present invention will be described below with reference to FIG. 22.

Figure 22:
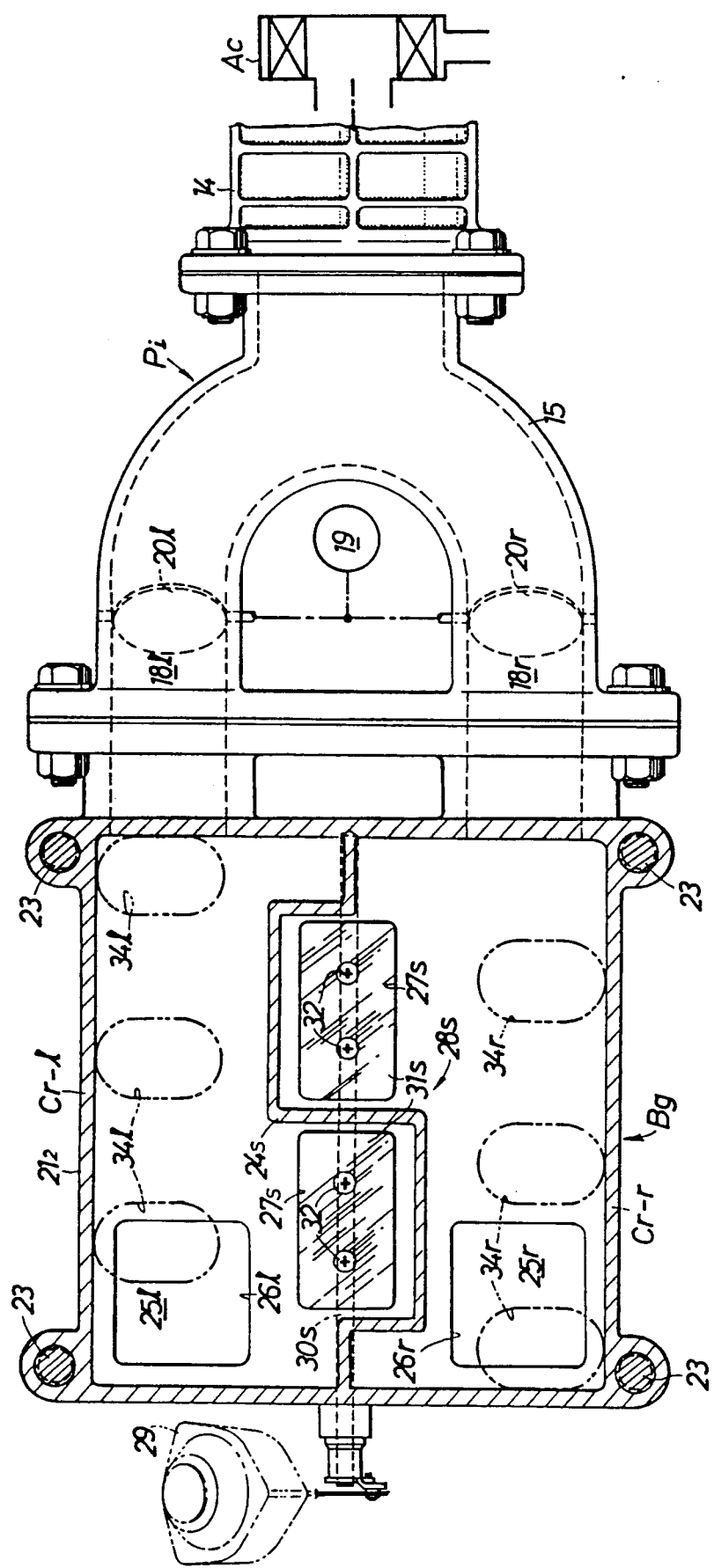
FIG. 22 is a sectional view of an intake system, similar to FIG. 18, but illustrating a seventh embodiment of the present invention.
Figure 23:
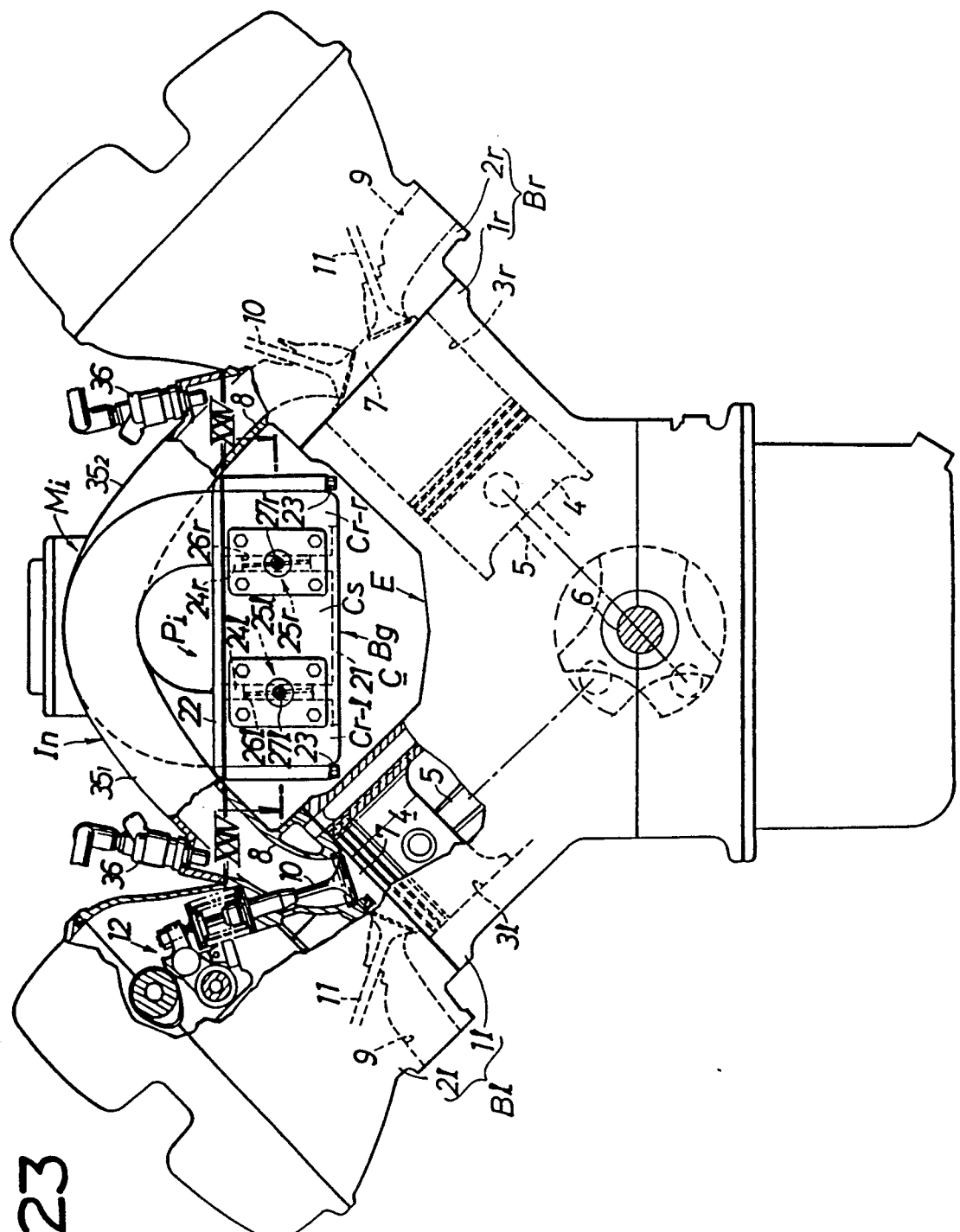

FIG. 22 is a sectional view of an intake system, similar to FIG. 18, wherein the same reference characters as in the previously described sixth embodiment designate the same components.

Omitted in the seventh embodiment are the left and right on-off valves 28l and 28r for short-circuiting the left and right resonance chambers Cr-l and Cr-r and the resonance passages 25l and 25r, and the actuator 29 for driving the on-off valves 28l and 28r, which have been used in the previous embodiment.

The difference between this embodiment and the previous embodiment is that the resonance supercharge effect is obtained at two stage in the lower speed rotation region of the engine in the previous embodiment, whereas the resonance supercharge is obtained only at one stage in the lower speed rotation region of the engine in this embodiment. However, with regard to the compactness of the resonance chamber assembly box Bg and for the reduction of the manufacturing cost, this embodiment has the same effect as in the previous embodiment.

In the sixth and seventh embodiments, the duties of the upper and lower assembly box portions $21_1$ and $21_2$ may be exchanged from each other and hence, the left and right resonance chambers Cr-l and Cr-r can be defined in the lower assembly box portion $21_1$, and the pair of resonance passages 25r and 25l and the communication chamber Cs can be defined in the upper assembly box portion $21_2$.

FIGS. 23 to 26 illustrate an eighth embodiment of the present invention. In this embodiment, an intake system In is disposed within a V-space C between the left and right cylinder blocks 1l and 1r and comprises an air cleaner Ac, an intake passage Pi connected to an outlet of the air cleaner Ac, a resonance chamber assembly box Bg having a pair of left and right resonance chambers Cr-l and Cr-r and connected to a downstream end of the intake passage Pi, and an intake manifold Mi joined to those end faces of the left and right cylinder blocks 1l and 1r at which the intake ports 8 are opened, thereby permitting the communication between the left and right resonance chambers Cr-l and Cr-r and the right and left cylinder groups Cr and Cl, respectively.

Figure 24:
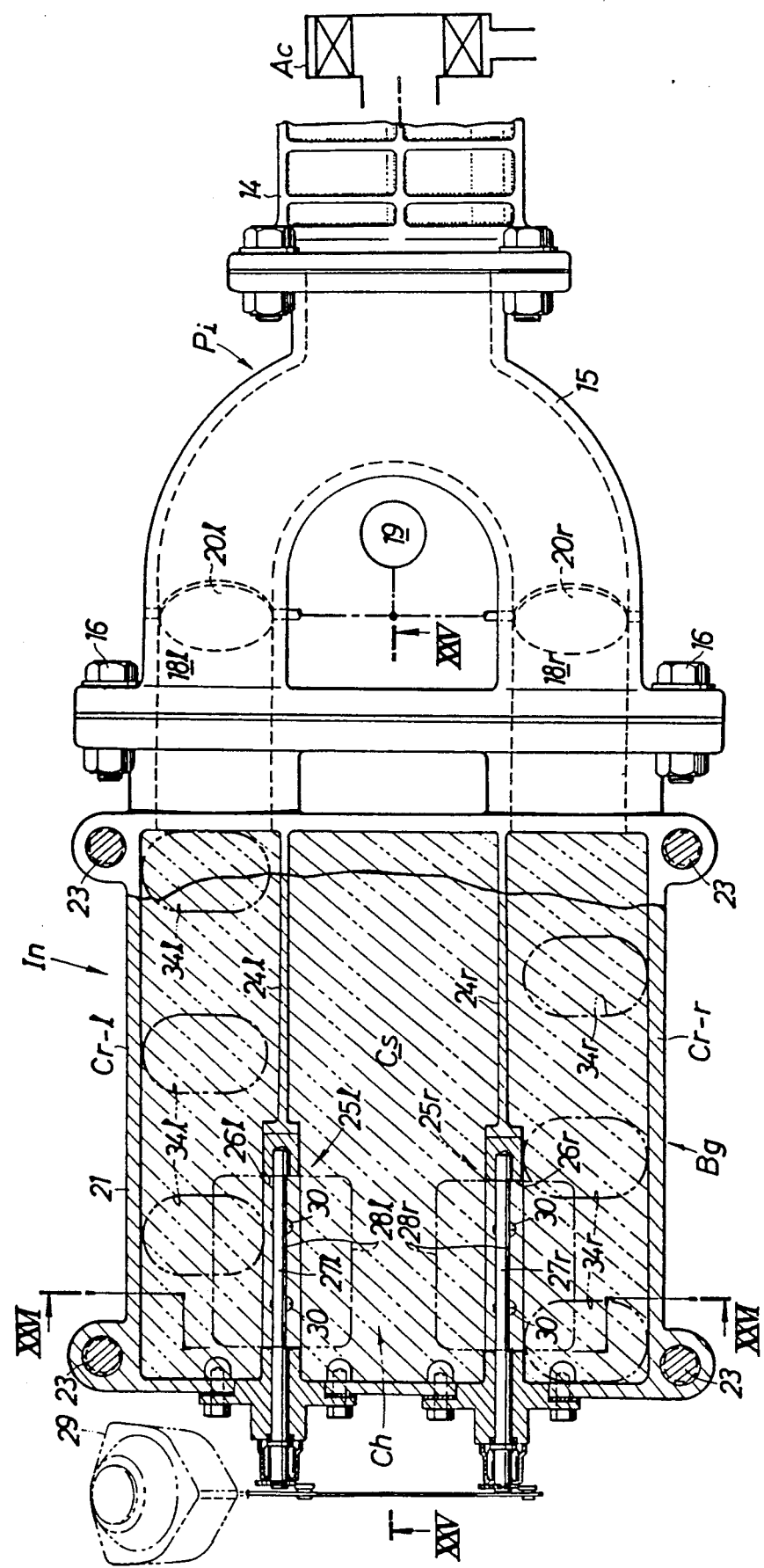

The intake passage Pi is constructed with a throttle body 15 being integrally connected to a downstream end of an intake passage 14 connected to the air cleaner Ac, as shown in FIG. 24. The intake passage 14 is formed into a hollow cylindrical shape so that an intake gas from the air cleaner Ac may be drawn thereinto, and the throttle body 15 is bifurcated, at a downstream of the junction with the intake passage 14, into left and right branch passages 18l and 18r. Throttle valves 20l and 20r are mounted within the branch passages 18l and 18r, respectively and controllable for opening and closing by a common control 19. The resonance chamber assembly box Bg is integrally connected to a downstream end of the throttle body 15 by bolts 16.

The resonance chamber assembly box Bg is comprised of a substantially rectangular parallelepiped-shaped lower assembly box body 21 opened at its upper surface and connected to the throttle body 15, and a lid 22 air-tightly mounted on the opened upper surface by bolts 23. The lid 22 is formed in an integral relation to the intake manifold Mi.

Figure 25:
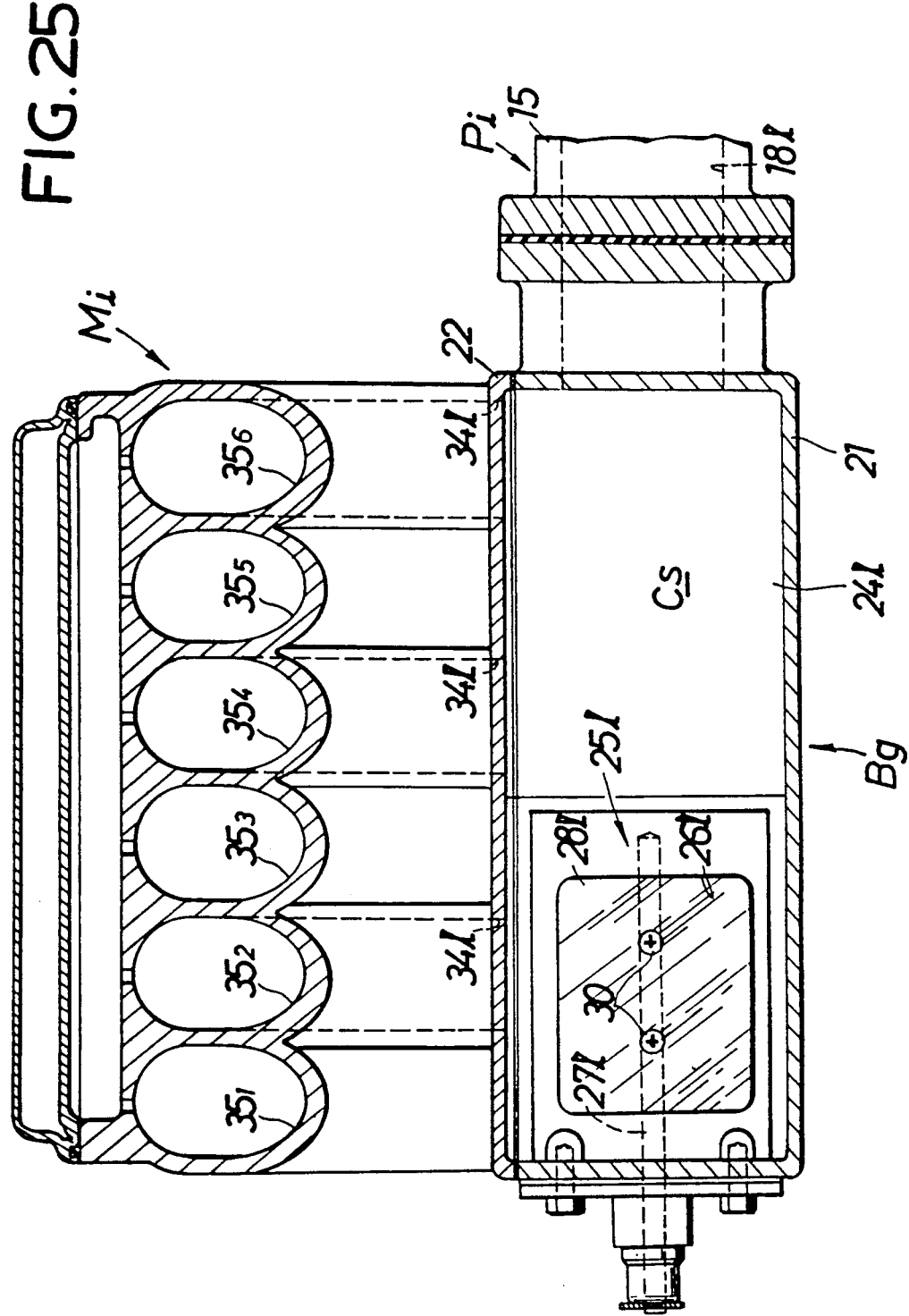
Figure 26:
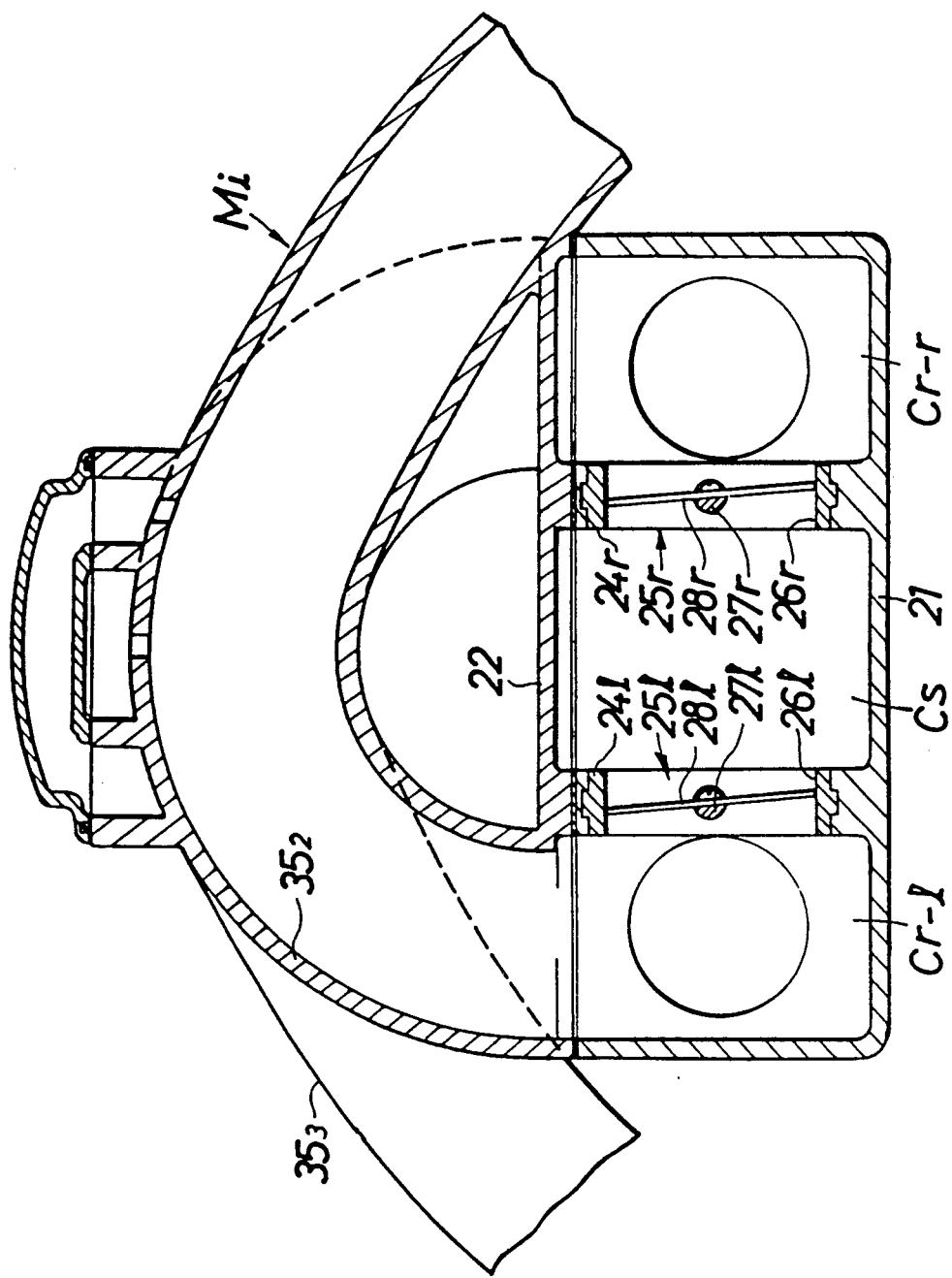

It can be seen from FIGS. 25 and 26 that the resonance chamber assembly box Bg is divided into left and right resonance chambers Cr-l anbd Cr-r extending in parallel to each other and a communication chamber Cs located between the resonance chambers Cr-l and Cr-r by two partition walls 24l and 24r extending in a direction of a crank shaft 6 of an engine, i.e., in a direction of a flow of an intake gas within the box Bg. Downstream ends of the left and right branch passages 18l and 18r of the throttle body 15 communicate with upstream ends of the left and right resonance chambers Cr-l and Cr-r, respectively.

On-off valves 25l and 25r are mounted in the two partition walls 24l and 24r for permitting the left and right resonance chambers Cr-l and Cr-r and the communication chamber Cs to be put into and out of communication with each other. More specifically, quadrilateral valve bores 26l and 26r are opened in the partition walls 24l and 24r, respectively, and rotatable valve stems 27l and 27r are inserted into central portions of the partition walls 24l and 24r from the outside of the assembly box body 21 in a longitudinal direction of the intake system to extend through central portions of the valve bores 26l and 26r, respectively. Rectangular plate-like valve members 28l and 28r mounted in the valve bores 26l and 26r are secured to the valve stems 27l and 27r by machine screws 30, respectively. A portion of each of the valve stems 27l and 27r passes through a rear end wall of the assembly box body 21 to project outside the rear end wall, and a conventionally know actuator 29 is connected to such projecting ends. The actuator 29 is controlled for operation in accordance with the operational condition of the engine so as to control the opening and closing of the on-off valves 25*l* and 25*r*. For example, during a lower speed operation of the engine, the on-off valves 25*l* and 25*r* may be controlled to be closed, and during a higher speed operation, the on-off valves 25*l* and 25*r* may be controlled to be opened.

The volume of the left and right resonance chambers Cr-l and Cr-r with the on-off valves 25*l* and 25*r* closed is set at a level such that an optimal resonance supercharge effect may be obtained in a lower speed rotation region of the engine. The volume of the communication chamber Cs is set at a level such that when the on-off valves 25*l* and 25*r* have been controlled to be opened, thereby putting the left and right chambers Cr-l and Cr-r and the communication chamber Cs into communication with one another to establish a larger-volume inertia supercharge distributing chamber Ch shown by a two-dashed line in FIG. 24, the volume of this larger-volume inertia supercharge distributing chamber Ch shown by a two-dashed line in FIG. 24, the volume of this larger-volume inertia supercharge distributing chamber Ch may be equal to a volume enough to provide an optimal inertia supercharge effect in a higher speed rotation region of the engine.

Three elliptically-shaped left and right exhaust ports 34*l* and 34*r* are opened in upper walls of the left and right resonance chambers Cr-l and Cr-r along their longitudinal axis. The three exhaust ports 34*l* of the left resonance chamber Cr-l communicate with the three cylinders 3*r* (in which the suction sequence is not continuous), respectively, in the right cylinder block 1*r* located on the opposite side from the left resonance chamber Cr-l through the intake manifold Mi, and the three exhaust ports 34*r* of the right resonance chamber Cr-r likewise communicate with the three cylinders 3*l* (in which the suction sequence is not continuous), respectively, in the left cylinder block 1*l* located on the opposite side from the right resonance chamber Cr-r through the intake manifold Mi.

The operation of the eighth embodiment will be described below.

The actuator 29 is controlled for operation in accordance with the operational condition of the engine. For example, in a lower speed operation condition of the engine, the on-off valves 25*l* and 25*r* are controlled to be closed as shown by a solid line in FIGS. 24 to 26 to close their valve bores 26*l* and 26*r*, whereby of the left and right resonance chambers Cr-l and Cr-r is cut off. In this state, there are established two series of intake systems comprising the resonance passages 18*l* and 18*r* for each cylinder group, the left and right resonance chambers Cr-l and Cr-r for each cylinder group, and the left and right distributor pipes 35$_1$, 35$_2$, 35$_3$, 35$_4$, 35$_5$ and 35$_6$ for each cylinder group, i.e., two series of resonance supercharge intake systems which produce no suction interference and each extend from the three cylinders 3*l*, 3*r* to the outlet of the throttle body 15. Moreover, the volume of the resonance chambers Cr-l and Cr-r is set such that the natural frequency of the resonance supercharge system may be in substantial accord with the period of opening and closing of each intake valve 10 in a lower speed rotation region of the engine. This ensures that the resonance supercharge effect is effectively accomplishing to increase the volume efficiency in the lower speed region of the engine.

When the engine has been brought into a higher speed operation, the on-off valve 25*l* and 25*r* are controlled to be opened, permitting the left and right resonance chambers Cr-l and Cr-r and the communication chamber Cs to be put into communication with one another through the valve bores 26*l* and 26*r*, thereby establishing a larger volume inertia supercharge distributing chamber Ch which communicates commonly with left and right three cylinders 3*l* and 3*r*. In this state, the two series of resonance intake systems are cancelled and instead, an inertia supercharge system is established with a negative pressure wave produced in an intake stroke of the engine being reflected and turned in the larger volume inertia supercharge distributing chamber Ch and with a positive pressure wave being propagated to the intake port 8 of each cylinder 3*l*, 3*r*. Moreover, the passage length of propagation of the negative and positive pressure waves is reduced to enable the period of intake pressure to accord with the period of opening and closing of intake valve 10 during a high speed rotation of the engine. Further, proper setting of the volume of the communication chamber Cs makes it possible to insure a larger volume of the inertia supercharge distributing chamber Ch required to enhance the inertia supercharge effect in a high speed rotation region of the engine, thereby effectively accomplishing the inertia supercharge effect in such operational region to increase the volume efficiency.

In addition, since the pair of resonance chambers Cr-l and Cr-r and the communication chamber are integrally defined within the resonance chamber assembly box Bg and moreover, since the on-off valves 25*l* and 25*r* are provided in the partition walls 24*l* and 24*r*, the structure of the intake system can be simplified and the shape thereof can be made compact.

Figure 27:
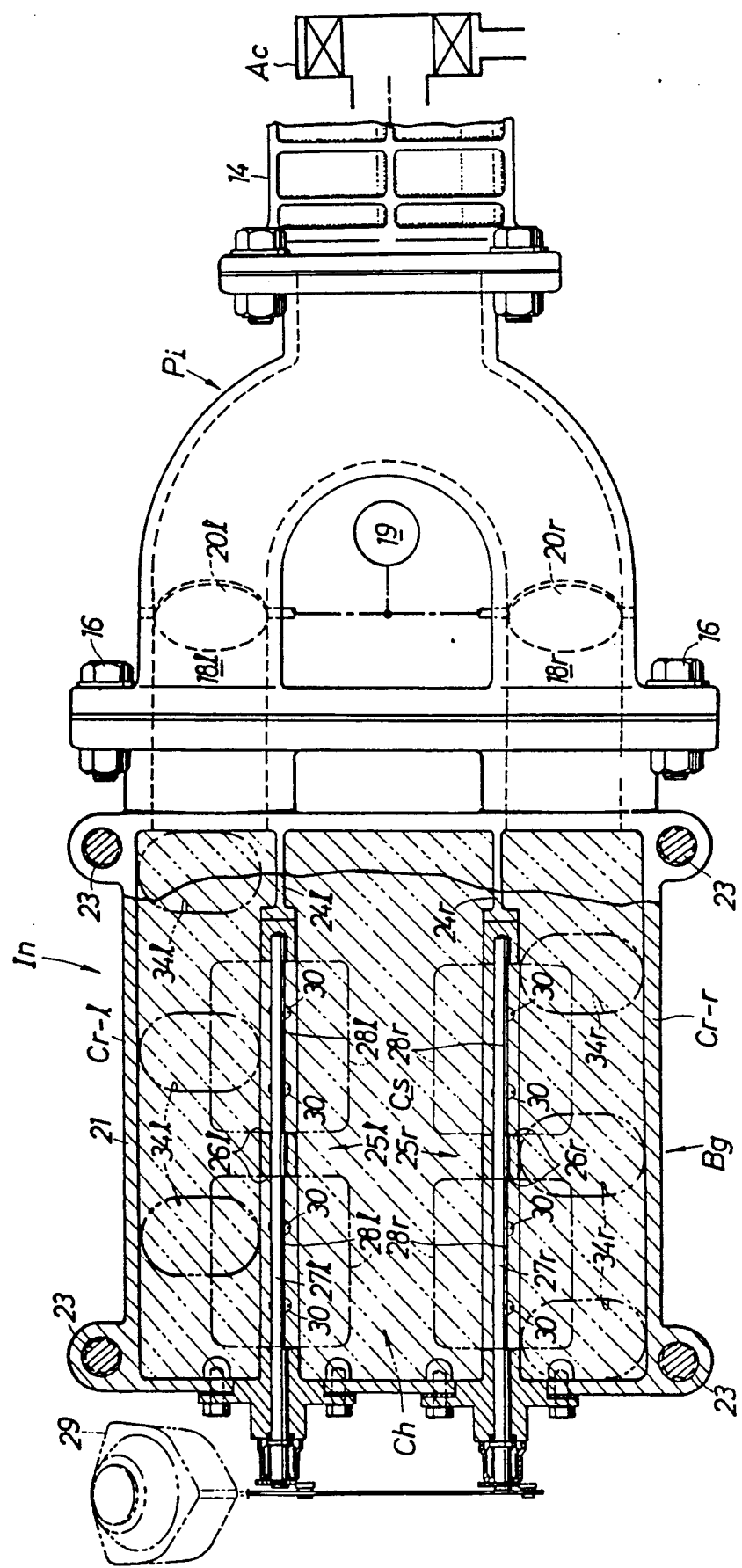
FIG. 27 is a sectional view of an intake system, similar to FIG. 24, but illustrating a ninth embodiment of the present invention.

FIG. 27 is a sectional view of an intake system, similar to FIG. 26, wherein the same reference characters as in the previously-described eighth embodiment designate the same components.

In this ninth embodiment, the structure of on-off valves 25*l*' and 25*r*' in the resonance chamber assembly box Bg differs from that in the previously described eight embodiment. More specifically, two valve bores 26*l*', 26*r*' are opened in each of the left and right partition walls 24*l* and 24*r*. These four valve bores 26*l*' and 26*r*' may be opened and closed all together by the corresponding sets of two on-off valves 25*l*' and 25*r*' secured to left and right valve stems 27*l*' and 27*r*'.

According to this embodiment, the left and right resonance chambers Cr-l and Cr-r may be put in a moment into communication with the communication chamber Cs through the corresponding left and right sets of two valve bores 26*l*' and 26*r*' to establish an inertia supercharge distributing chamber Ch, resulting in an improvement of the response.

What is claimed is:

1. An intake device for a multi-cylinder internal combustion engine, said engine being V-shaped and including left and right groups of cylinders having such an order of ignition that any one of the cylinders is not ignited immediately before or after ignition of the other cylinders of the same group, and said intake device comprising a pair of resonance chambers independently communicating with said left and right groups of cylinders, and a pair of resonance passages communicating at their downstream sides with the resonance chambers and at their upstream sides with the atmosphere through a throttle valve, wherein said pair of resonance chambers and said pair of resonance passages are disposed in parallel in a V-space defined between the left and right groups of cylinders, with a common dividing wall interposed therebetween.

2. An intake device according to claim 1, further including an on-off valve provided in said dividing wall and capable of changing the length of said resonance passages.

3. An intake device for a multi-cylinder internal combustion engine, comprising a pair of resonance chambers independently communicating with groups of cylinders having such an order of ignition that any one of the cylinders is not ignited immediately before or after ignition of the other cylinders of the same group, and a pair of resonance passages communicating at their downstream sides with the resonance chambers and at their upstream sides with the atmosphere through a throttle valve, wherein said intake device further includes a resonance chamber assembly box which comprises an upper assembly box portion opened at a lower surface thereof, a lower assembly box portion opened at an upper surface thereof, and a plate-like valve unit dividing the opened surfaces of the upper and lower assembly box portions, said pair of resonance chambers being formed in one of the assembly box portions, said pair of resonance passages being formed in the other assembly box portion, and an on-off valve capable of changing suction characteristics of the internal combustion engine being provided in the valve unit.

4. An intake device according to claim 3, wherein the length of said resonance passages is changed by means of said on-off valve.

5. An intake device according to claim 3, wherein said resonance chambers are put into communication with each other by means of said on-off valve.

6. An intake device for a multi-cylinder internal combustion engine, comprising a pair of resonance chambers independently communicating with groups of cylinders having such an order of ignition that any one of the cylinders is not ignited immediately before or after ignition of the other cylinders of the same group, and a pair of resonance passages communicating at their downstream sides with the resonance chambers and at their upstream sides with the atmosphere through a throttle valve, wherein said intake device further includes a resonance chamber assembly box which comprises an upper assembly box portion opened at a lower surface thereof, a lower assembly box portion opened at an upper surface thereof, and a plate-like valve unit dividing the opened surfaces of said upper and lower assembly box portions, said pair of resonance chambers being formed in one of the assembly box portions, the pair of resonance passages being formed in the other assembly box portion, and said valve unit including an on-off valve for changing the length of said resonance passages and another on-off valve for permitting said resonance chambers to be put into communication with each other, said both valves being disposed in a plane where said valve unit lies.

7. An intake device for a multi-cylinder internal combustion engine, comprising a pair of resonance chambers independently communicating with groups of cylinders having such an order of ignition that any one of the cylinders is not ignited immediately before or after ignition of the other cylinders of the same group, and a pair of resonance passages communicating at their downstream sides with the resonance chambers and at their upstream sides with the atmosphere through a throttle valve, wherein said pair of resonance chambers are in a spaced and parallel arrangement with respect to each other and said intake device further includes an elongated communication chamber provided parallel to and between said pair of resonance chambers with a pair of partition means separating said communication chamber from said resonance chambers for said resonance chambers to communicate with said communication chamber through respective on-off valves provided in the respective partition means.

8. An intake device for a multi-cylinder internal combustion engine, comprising a pair of resonance chambers independently communicating with groups of cylinders having such an order of ignition that any one of the cylinders is not ignited immediately before or after ignition of the other cylinders of the same group, and a pair of resonance passages communicating at their downstream sides with the resonance chambers and at their upstream sides with the atmosphere through a throttle valve, wherein said intake device includes a communication chamber provided between said pair of resonance chambers so that said resonance chambers communicate with each other through said communication chamber, and wherein said intake device further includes a resonance chamber assembly box which comprises an upper assembly box portion opened at a lower surface thereof, a lower assembly box portion opened at an upper surface thereof, and a plate-like valve unit separating and joined to the opened surfaces of the upper and lower assembly-box portions, said pair of resonance chambers being formed in one of the assembly box portions, said pair of resonance passages being formed in the other assembly box portion, and an on-off valve capable of changing suction characteristics of the internal combustion engine being provided in the plate-like valve unit.

* * * * *